US011483268B2

(12) United States Patent
Yang et al.

(10) Patent No.: US 11,483,268 B2
(45) Date of Patent: Oct. 25, 2022

(54) CONTENT NAVIGATION WITH AUTOMATED CURATION

(71) Applicant: Snap Inc., Santa Monica, CA (US)

(72) Inventors: Jianchao Yang, Los Angeles, CA (US); Yuke Zhu, Stanford, CA (US); Ning Xu, Irvine, CA (US); Kevin Dechau Tang, Los Angeles, CA (US); Jia Li, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 154 days.

(21) Appl. No.: 16/918,343

(22) Filed: Jul. 1, 2020

(65) Prior Publication Data
US 2021/0021551 A1 Jan. 21, 2021

Related U.S. Application Data

(63) Continuation of application No. 15/251,976, filed on Aug. 30, 2016, now Pat. No. 10,733,255.
(Continued)

(51) Int. Cl.
G06F 17/00 (2019.01)
H04L 51/10 (2022.01)
(Continued)

(52) U.S. Cl.
CPC .............. H04L 51/10 (2013.01); G06F 16/22 (2019.01); G06F 16/24578 (2019.01);
(Continued)

(58) Field of Classification Search
CPC ......... H04L 51/10; H04L 51/32; H04L 67/26; H04L 67/42; H04L 51/20; H04L 51/52;
(Continued)

(56) References Cited

U.S. PATENT DOCUMENTS 5,867,799 A * 2/1999 Lang ................... G06F 16/9535
6,038,295 A 3/2000 Mattes
(Continued)

FOREIGN PATENT DOCUMENTS

CA 2887596 A1 7/2015

OTHER PUBLICATIONS

"U.S. Appl. No. 15/251,976, Advisory Action dated Feb. 27, 2019", 3 pgs.
(Continued)

Primary Examiner — Greta L Robinson
(74) Attorney, Agent, or Firm — Schwegman Lundberg & Woessner, P.A.

(57) ABSTRACT

Systems, devices, methods, media, and instructions for automated image processing and content curation are described. In one embodiment a server computer system communicates at least a portion of a first content collection to a first client device, and receives a first selection communication in response, the first selection communication identifying a first piece of content of the first plurality of pieces of content. The server analyzes analyzing the first piece of content to identify a set of context values for the first piece of content, and accesses accessing a second content collection comprising pieces of content sharing at least a portion of the set of context values of the first piece of content. In various embodiments, different content values, image processing operations, and content selection operations are used to curate the content collections.

20 Claims, 21 Drawing Sheets

Related U.S. Application Data

(60) Provisional application No. 62/357,177, filed on Jun. 30, 2016.

(51) Int. Cl.

| | | |
|---|---|---|
| *G06F 16/22* | (2019.01) | |
| *G06F 16/51* | (2019.01) | |
| *G06F 16/583* | (2019.01) | |
| *G06N 20/00* | (2019.01) | |
| *G06F 16/9535* | (2019.01) | |
| *G06F 16/954* | (2019.01) | |
| *G06F 16/2457* | (2019.01) | |
| *G06F 16/951* | (2019.01) | |
| *G06N 3/04* | (2006.01) | |
| *G06N 3/08* | (2006.01) | |
| *G06V 20/00* | (2022.01) | |
| *H04L 51/52* | (2022.01) | |
| *G06T 7/00* | (2017.01) | |
| *H04L 67/01* | (2022.01) | |
| *H04L 67/55* | (2022.01) | |

(52) U.S. Cl.
CPC .......... *G06F 16/51* (2019.01); *G06F 16/5854* (2019.01); *G06F 16/951* (2019.01); *G06F 16/954* (2019.01); *G06F 16/9535* (2019.01); *G06N 3/04* (2013.01); *G06N 3/08* (2013.01); *G06N 20/00* (2019.01); *G06V 20/35* (2022.01); *H04L 51/52* (2022.05); *G06T 7/0002* (2013.01); *G06T 2207/20084* (2013.01); *G06T 2207/30168* (2013.01); *H04L 67/01* (2022.05); *H04L 67/55* (2022.05)

(58) Field of Classification Search
CPC ....... H04L 67/01; H04L 67/55; H04L 51/222; G06F 16/22; G06F 16/24578; G06F 16/51; G06F 16/5854; G06F 16/951; G06F 16/9535; G06F 16/954; G06F 16/55; G06N 3/04; G06N 3/08; G06N 3/0454; G06N 20/00; G06V 20/35; G06V 20/41; G06T 7/0002; G06T 2207/20084; G06T 2207/30168; H04W 4/18
See application file for complete search history.

(56) References Cited

U.S. PATENT DOCUMENTS

| | | | |
|---|---|---|---|
| 6,980,909 B2 | 12/2005 | Root et al. | |
| 7,173,651 B1 | 2/2007 | Knowles | |
| 7,411,493 B2 | 8/2008 | Smith | |
| 7,535,890 B2 | 5/2009 | Rojas | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,323,810 B2 | 4/2016 | Wang et al. | |
| 9,443,227 B2 | 9/2016 | Evans et al. | |
| 9,479,577 B2 | 10/2016 | Aldamiz Echevarria et al. | |
| 9,489,661 B2 | 11/2016 | Evans et al. | |
| 9,491,134 B2 | 11/2016 | Rosen et al. | |
| 9,881,094 B2 | 1/2018 | Pavlovskaia | |
| 10,382,373 B1 | 8/2019 | Yang et al. | |
| 10,733,255 B1 | 8/2020 | Yang et al. | |
| 2008/0201225 A1 | 8/2008 | Maharajh et al. | |
| 2011/0202598 A1 | 8/2011 | Evans et al. | |
| 2012/0209924 A1 | 8/2012 | Evans et al. | |
| 2014/0372566 A1* | 12/2014 | Milne | G06F 16/954 709/219 |
| 2015/0262069 A1* | 9/2015 | Gabriel | G06F 16/9535 706/48 |
| 2016/0179844 A1 | 6/2016 | Shen et al. | |
| 2016/0182425 A1* | 6/2016 | Asghar | H04L 51/36 709/206 |
| 2016/0380953 A1 | 12/2016 | Mashtakov | |
| 2017/0103783 A1 | 4/2017 | Paglia et al. | |

OTHER PUBLICATIONS

"U.S. Appl. No. 15/251,976, Examiner Interview Summary dated Mar. 1, 2019", 17 pgs.

"U.S. Appl. No. 15/251,976, Final Office Action dated Oct. 8, 2019", 8 pgs.

"U.S. Appl. No. 15/251,976, Final Office Action dated Nov. 9, 2018", 12 pgs.

"U.S. Appl. No. 15/251,976, Non Final Office Action dated Apr. 1, 2019", 13 pgs.

"U.S. Appl. No. 15/251,976, Non Final Office Action dated Jun. 11, 2018".

"U.S. Appl. No. 15/251,976, Notice of Allowance dated Mar. 25, 2020", 9 pgs.

"U.S. Appl. No. 15/251,976, Response filed Feb. 11, 2019 to Final Office Action dated Nov. 9, 2018", 12 pgs.

"U.S. Appl. No. 15/251,976, Response filed Mar. 9, 2020 to Final Office Action dated Oct. 8, 2019", 12 pgs.

"U.S. Appl. No. 15/251,976, Response filed Mar. 11, 2019 to Advisory Action dated Feb. 27, 2019", 16 pgs.

"U.S. Appl. No. 15/251,976, Response filed Sep. 11, 2018 to Non Final Office Action dated Jun. 11, 2018", 12 pgs.

"U.S. Appl. No. 15/251,976, Response filed Aug. 1, 2019 to Final Office Action dated Apr. 1, 2019", 16 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

```
1300
```

1302 COMMUNICATING, BY A SERVER SYSTEM, AT LEAST A PORTION OF A FIRST CONTENT COLLECTION TO A FIRST CLIENT DEVICE, WHEREIN THE FIRST CONTENT COLLECTION COMPRISES A FIRST PLURALITY OF PIECES OF CONTENT

1304 RECEIVING, AT THE SERVER SYSTEM FROM THE FIRST CLIENT DEVICE, A FIRST SELECTION COMMUNICATION, THE FIRST SELECTION COMMUNICATION IDENTIFYING A FIRST PIECE OF CONTENT OF THE FIRST PLURALITY OF PIECES OF CONTENT

1306 ANALYZING THE FIRST PIECE OF CONTENT TO IDENTIFY A SET OF CONTEXT VALUES FOR THE FIRST PIECE OF CONTENT

1308 ACCESSING A SECOND CONTENT COLLECTION COMPRISING PIECES OF CONTENT SHARING AT LEAST A PORTION OF THE SET OF CONTEXT VALUES OF THE FIRST PIECE OF CONTENT, WHEREIN THE SECOND CONTENT COLLECTION IS SELECTED IN RESPONSE TO THE FIRST SELECTION COMMUNICATION BASED ON THE PORTION OF THE SET OF CONTEXT VALUES OF THE FIRST PIECE OF CONTENT

1310 COMMUNICATING AT LEAST A PORTION OF THE SECOND CONTENT COLLECTION TO THE FIRST CLIENT DEVICE

*FIG. 13*

CONTENT NAVIGATION WITH AUTOMATED CURATION

CLAIM OF PRIORITY

This application is a continuation of U.S. patent application Ser. No. 15/251,976, filed on Aug. 30, 2016, which claims the benefit of priority to U.S. Provisional Application Ser. No. 62/357,177, filed on Jun. 30, 2016, each of which is incorporated herein by reference in their entireties.

TECHNICAL FIELD

Embodiments of the present disclosure relate generally to computing systems and networks for image management and sharing, as well as image processing and automated organization of images.

BACKGROUND

Improvements in camera technology and the integration of high-quality image sensors with mobile devices such as smartphones have caused a large increase in the volume of images and image files that a person may interact with and manage. In addition to large numbers of images in personal galleries, users may also have content from other sources on a personal device. Content such as news stories or other collections of live or recent content have traditionally been presented to consumers in a heavily controlled and curated format. Early formats for news presentation included newspapers and magazines. Later formats included broadcast radio and television news. Traditional media and news sources for time sensitive content are typically heavily associated with corporations or well-known persons that gather and present information about current events and happenings. In the modern Internet era, many such news sources have fragmented, but core aspects of information gathering and presentation often remain associated with professionals gathering and sharing information in a way that is tied to an individual identity. While such practices have been able to support some news structures with valuable analysis, the process for generating stories where select professionals filter information and generate stories is time consuming and introduces significant delay between an event occurring and presentation of information to a news consumer. Similarly, individual management of content may overwhelm a user when the amount of content becomes excessive.

BRIEF DESCRIPTION OF THE SEVERAL VIEWS OF THE DRAWINGS

FIG. 13 illustrates a method for image processing and automated curation of content in accordance with some embodiments.

DETAILED DESCRIPTION

Figure 1:
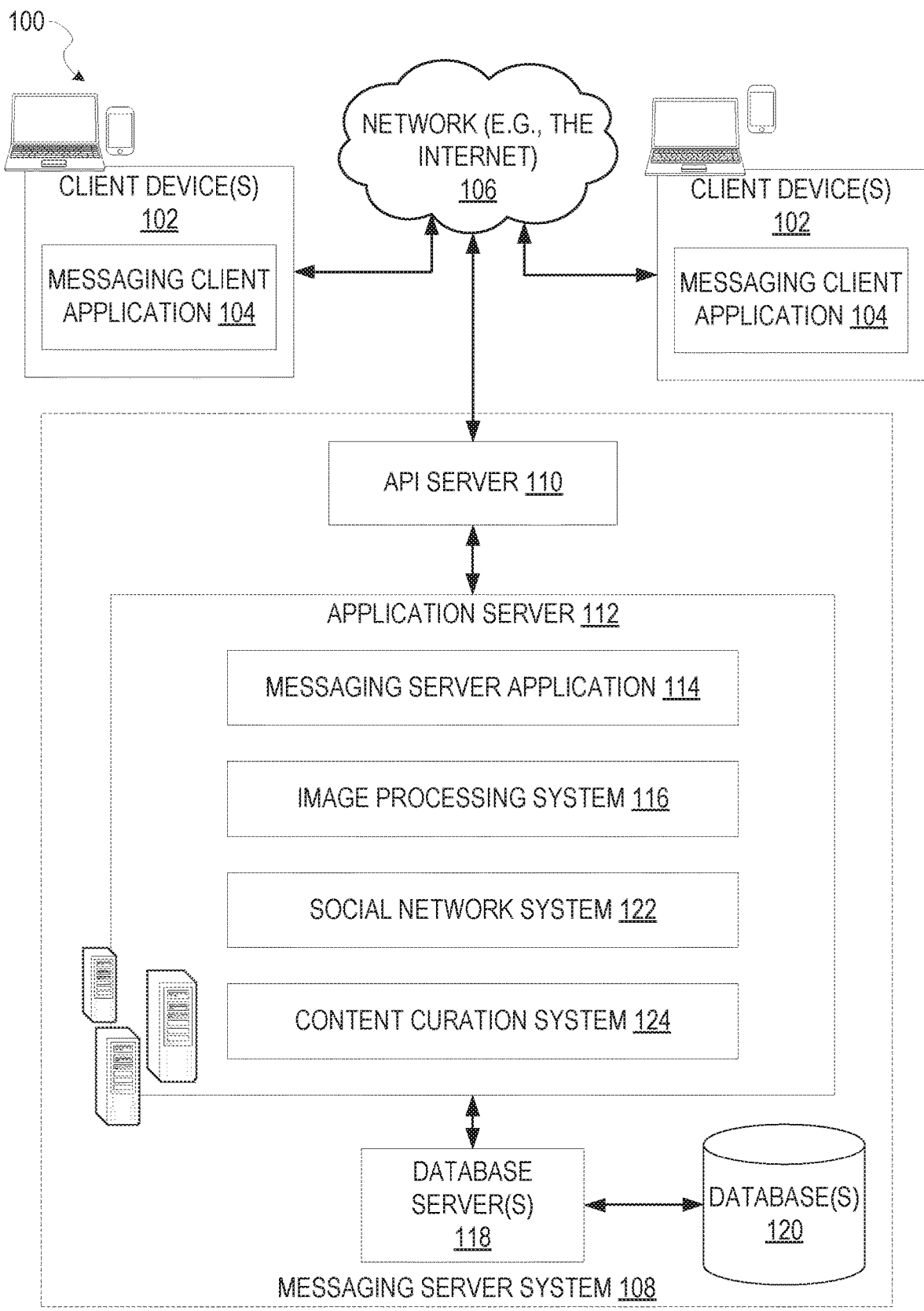
FIG. 1 is a block diagram showing an example messaging system for exchanging data (e.g., messages and associated content) over a network in accordance with some embodiments.

Embodiments described herein relate to image processing and machine learning for automatic or assisted curation of collections of content. Some embodiments relate to operations in a social network with content communicated from users to a system server that processes and organizes the received content. Some embodiments involve the use of machine learning to curate content using content metadata and other content data generated by image processing. Such curation may occur as part of a system for navigating and searching content collections by selecting an individual piece of content from a first content collection, and receiving a second content collection based on context values (e.g. various characteristics) of the selected piece of content.

"Content", as described herein, refers to one or more images or video clips captured by an electronic device, as well as any associated metadata descriptions and graphics or animation added to the image or video clip. This includes metadata generated by an electronic device capturing an image or video, as well as metadata that may be associated later by other devices. A "piece of content" refers to an individual image or video clip captured by a client device with any changes made to the image or video clip (e.g. transformations, filters, added text, etc.). Individual pieces of content may have multimedia elements, including drawings, text, animations, emoji, or other such elements added along with image or video clip elements. Content captured by an image sensor of a client device may be sent, along with any added multimedia elements from a user, via a network to other client devices as part of a social sharing network. Individual pieces of content may have time limits or associated display times, which are within a display threshold set by a system. For example, an embodiment system may limit video clips to 10 seconds or less, and may allow users to select display times less than 10 seconds for image content.

A "content message" as referred to herein refers to the communication of content between one or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections (e.g., stories.) In various systems, content messages may be sent from one individual user to another individual user, as, for example, an ephemeral message in addition to the ability to send content messages to a server computer system for inclusion in various content collections.

A "content collection" as described herein is an ordered set of content. The individual pieces of content that make up a particular content collection may be related in a variety of different ways. For example, in some embodiments, a content collection includes all pieces of content marked as public that are sent to a server system from a particular user within a certain time frame (e.g., within the past 24 hours). Access to such a content collection can be limited to certain other users (e.g., friends) identified by the user that generates the content for the collection. In some other embodiments, content collections include pieces of content from different users that are related by time, location, content, or other metadata. In some embodiments, content collections are referred to as stories. A story or content collection may be generated from pieces of content that are related in a variety of different ways, as is described in more detail throughout this document.

The automatic curation or automated assistance for operators performing curation is described herein. When a piece of content is generated or received, image processing is used to analyze the content. In different implementations this includes analyzing the quality of the content (e.g., blur, contrast, darkness) as well as performing machine vision operations to identify subject matter within the content (e.g., a building, a tree, a person, a car, etc.). These may be represented by one or more quality scores and associated with one or more context values.

Once an individual piece of content has associated context values (e.g. quality scores and content values), the piece of content is stored in a database with the context values, the quality scores, and any other associated metadata (e.g., time, location, ephemeral triggers, filters, etc.) The content may then be added to existing content collections, or analyzed during generation of a new content collection.

For example, a server system may maintain a content collection associated with the topic "dogs." If the piece of content is associated with a context value indicating that a dog was identified from machine vision processing of the image, the piece of content may be associated with this content collection. A system may analyze the piece of content to determine if there is a match with any number of existing content collections.

In another example, additional criteria are analyzed to limit the number of pieces of content for a particular content collection, or to generate collections of content from content within the database. Content age, content quality, distance of a content capture location from a fixed point, or other such data elements may be used to cluster pieces of content into content collections.

For example, a server may periodically receive content containing images of surfers along a particular stretch of beach. When such a picture is received, it is processed to identify that it is an image of an ocean wave with a surfboard, and is stored with a time, location, and a set of image quality scores. At a later time, the server may determine that a content collection of surfing for the particular beach is to be generated. Once the available images are identified by topic, the content related to that topic is processed based on the time, location, and quality values for each piece of content associated with that topic to identify content for inclusion in the content collection. In some such embodiments, clusters of content are identified, and then sampled probabilistically for inclusion in a content collection or for presentation to an operator for inclusion in a collection through a curation tool.

In some embodiments, a user has access to a search exploration tool that allows simple searching and navigation among content collections. When a first content collection is presented to a user, the user selects a first piece of content from the collection, and a new content collection is provided based on the context values associated with the selected piece of content. For example, if a user is viewing the content collection showing images of surfers along the particular stretch of beach, and a piece of content is selected from that collection, a new collection is sent to the user based on the context values of the selected piece of content. If the selected piece of content shows a sailboat in the background, content with sailboats instead of surfers can be included in the new content collection. Any other such context values of the selected piece of content may be used based on system settings and user selections, such as time, image content, location, or any other such context values.

In other embodiments, various other sorting or classification operations are used to define content collections from content received from different users as described herein.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration; login functionality; the sending of messages via the application server 112 from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of a list of friends of a user of a client device 102; the retrieval of such collections; the retrieval of messages and content; the adding and deletion of friends to a social graph; the location of friends within a social graph; opening an application event (e.g., relating to the messaging client application 104).

The application server 112 hosts a number of applications and subsystems, including a messaging server application 114, an image processing system 116, a social network system 122, and an content curation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 (shown in FIG. 3) within the database(s) 120. Examples of functions and services supported by the social network system 122 include the identification of other users of the messaging system 100 with which a particular user has relationships or is "following," and also the identification of other entities and interests of a particular user.

The content curation system 124 provides functionality to process information for content and to match content with collections or to generate new collections. In some embodiments, the content curation system 124 operates as an independent automatic system for machine analysis and generation of content collections. In other embodiments, content curation system 124 uses machine processing to filter content and to provide a limited number of pieces of content to an operator of a curation tool for final selection of the content to be included in a collection. Similarly, some embodiments include a mixture of automatically curated and assisted curation content collections, with interfaces for automatically curated collections to be adjusted by an operator using a curation tool. This may be done, for example, in response to user feedback identifying one or more pieces of content in an automatically curated collection as being identified for review and/or removal from the collection.

The application server 112 is communicatively coupled to a database server(s) 118, which facilitates access to a database(s) 120 in which is stored data associated with messages processed by the messaging server application 114.

Figure 2:
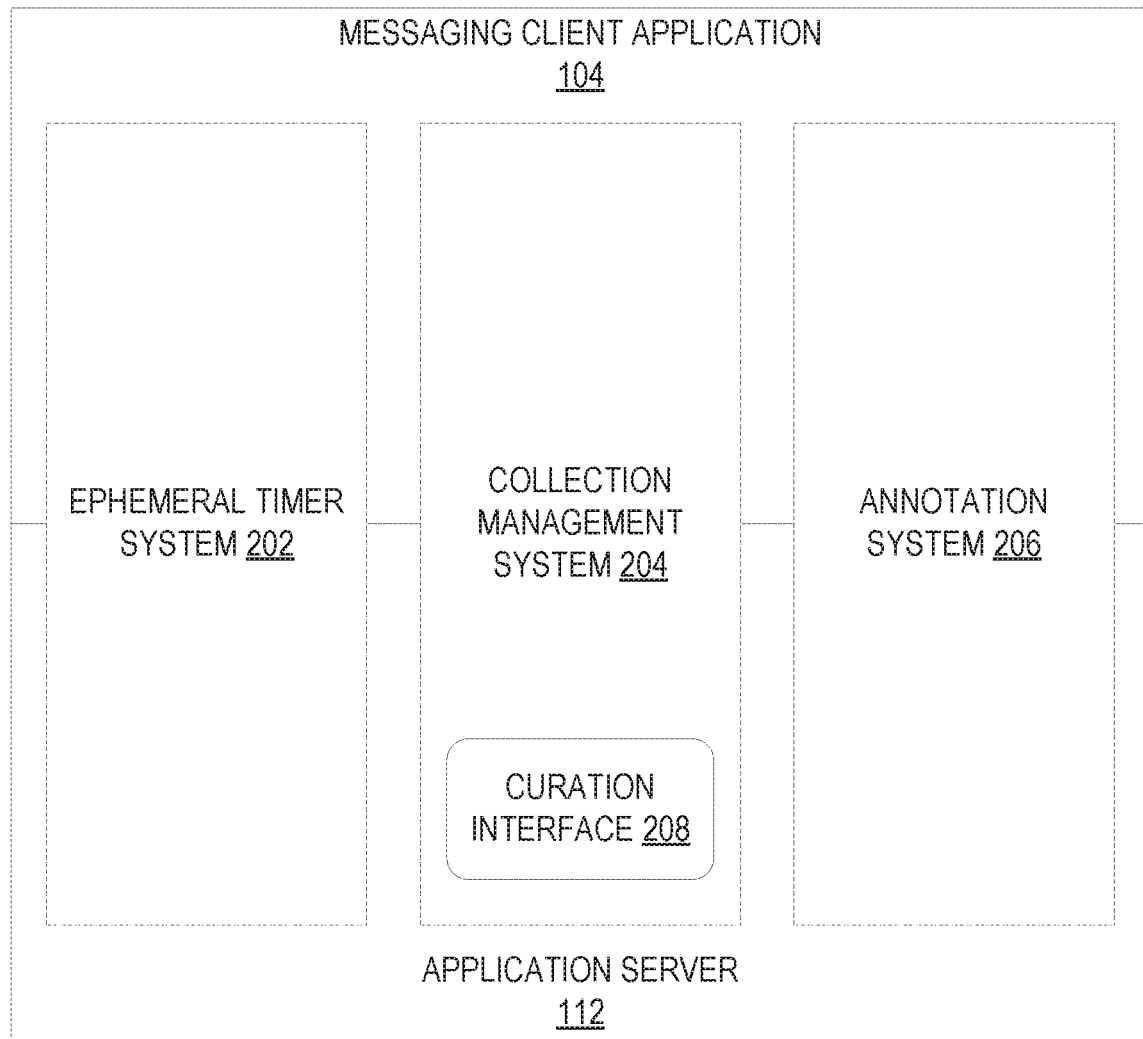
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content. In some embodiments, curation and machine vision may operate as described below with respect to FIG. 8.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 20 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
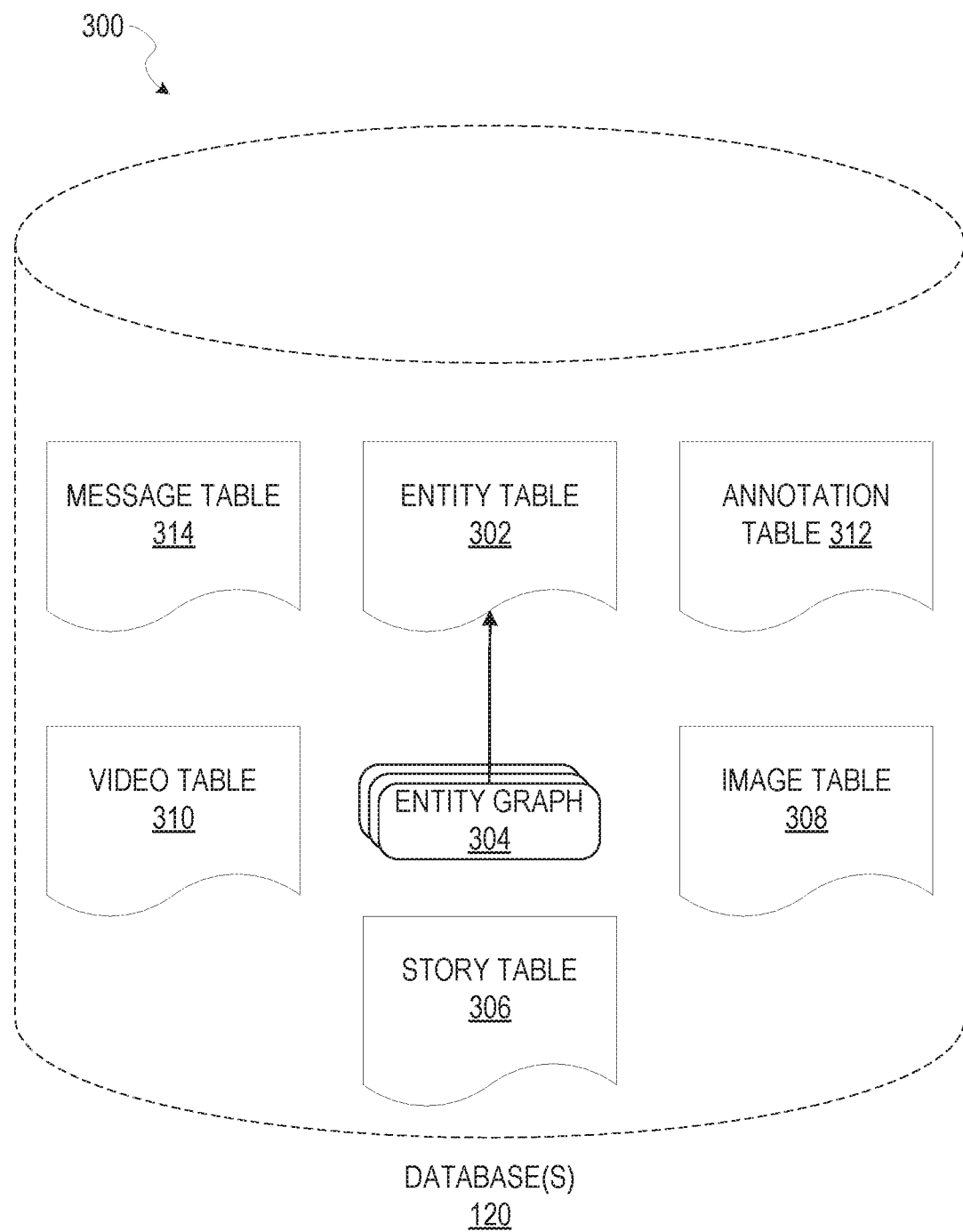
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram illustrating data 300 which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
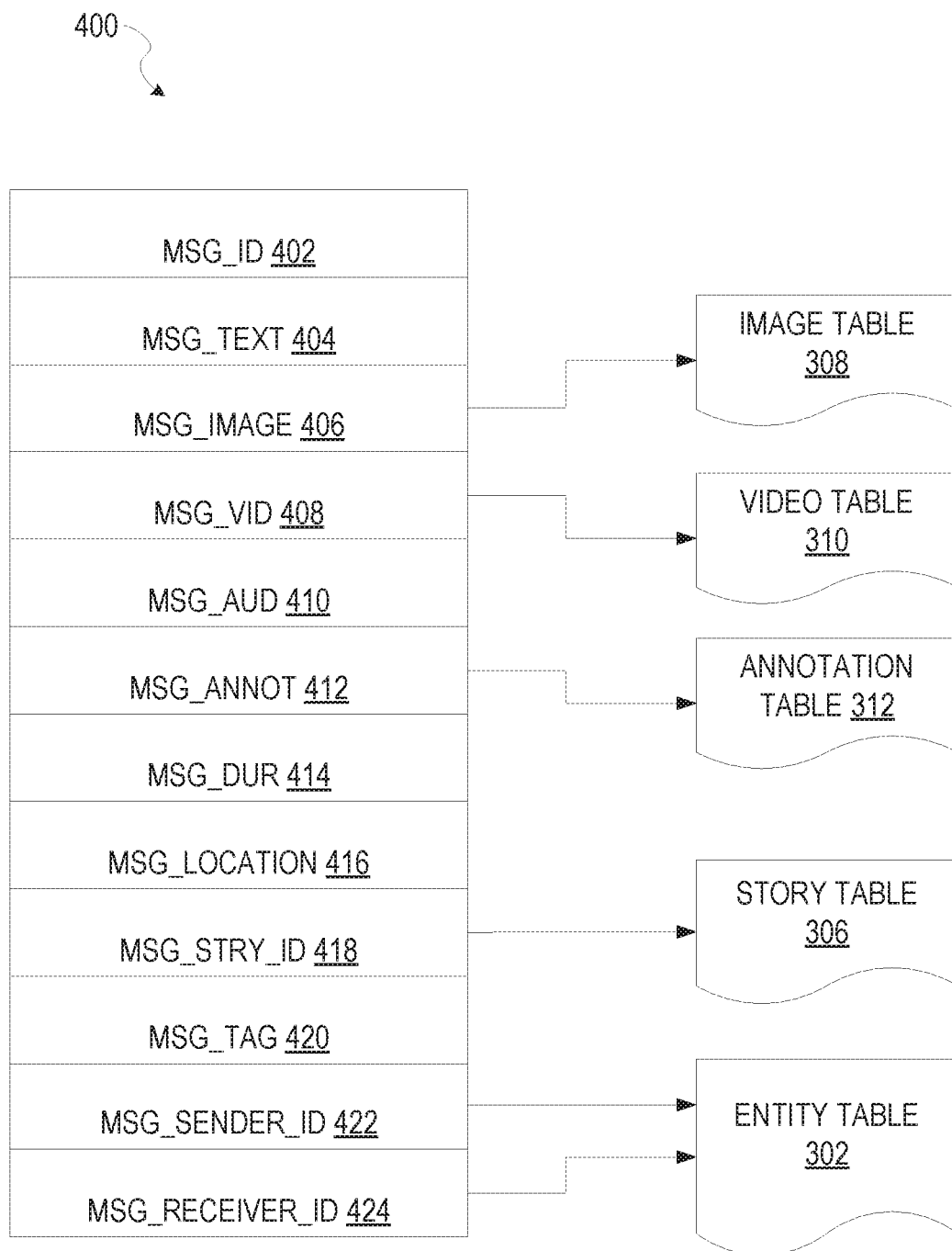
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represent annotations to be applied to message image payload 406, message video payload 408, or message audio payload 410 of the message 400.

A message duration parameter 414: parameter value indicating, in seconds, the amount of time for which content of the message 400 (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
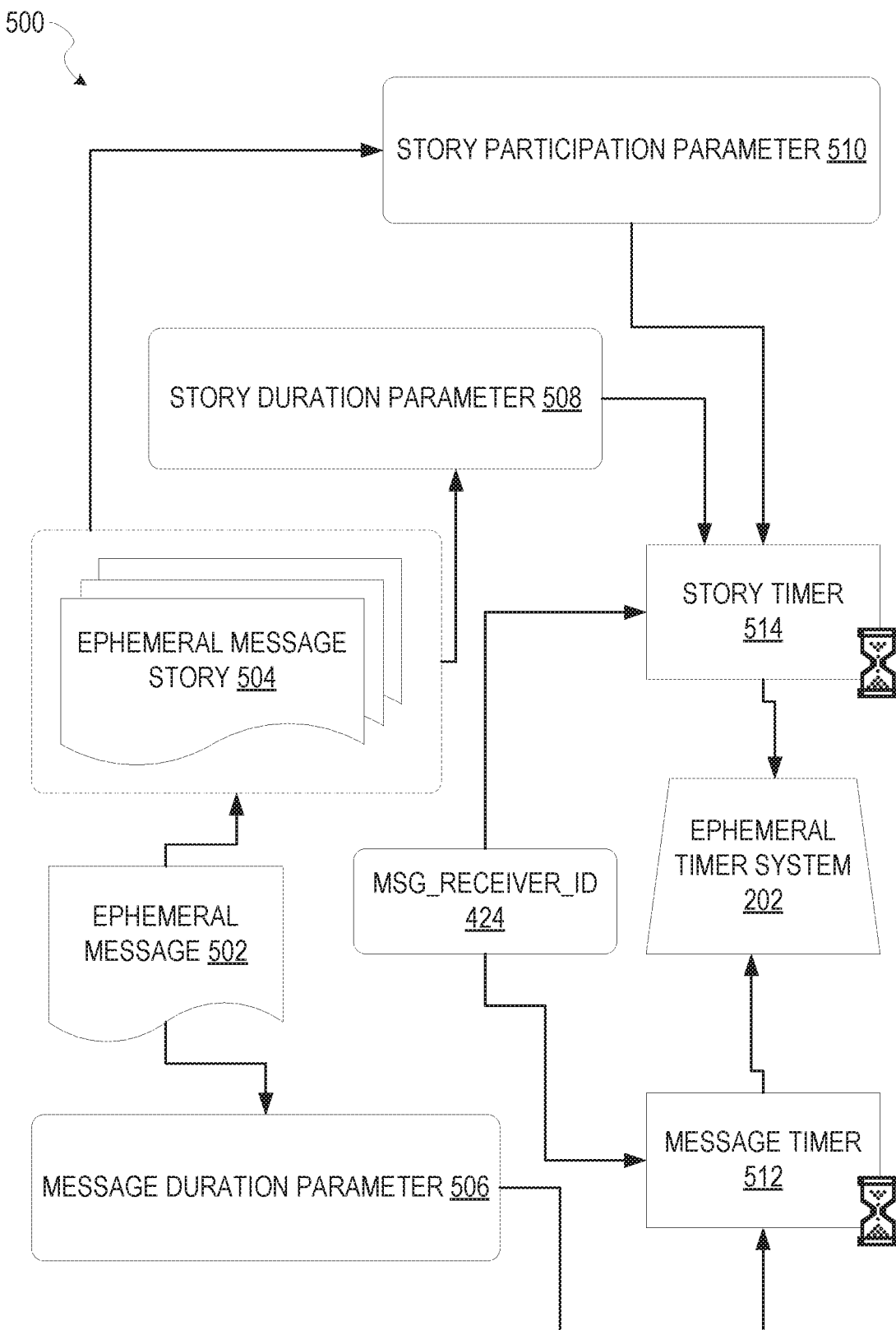
FIG. 5 is a schematic diagram illustrating an example access-limiting process, in terms of which access to content (e.g., an ephemeral message, and associated multimedia payload of data) or a content collection (e.g., an ephemeral message content collection) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 1202, which is responsible for the overall timing of display of content (e.g., an ephemeral message 502) to a receiving user.

The ephemeral message 502 is shown in FIG. 5 to be included within an ephemeral message content collection 504 (e.g., a personal SNAPCHAT content collection, or an event content collection). The ephemeral message content collection 504 has an associated content collection duration parameter 508, a value of which determines a time-duration for which the ephemeral message content collection 504 is presented and accessible to users of the messaging system 100. The content collection duration parameter 508, for example, may be the duration of a music concert, where the ephemeral message content collection 504 is a collection of content pertaining to that concert. Alternatively, a user (either the owning user or a curator user) may specify the value for the content collection duration parameter 508 when performing the setup and creation of the ephemeral message content collection 504.

Additionally, each ephemeral message 502 within the ephemeral message content collection 504 has an associated content collection participation parameter 510, a value of which determines the duration of time for which the ephemeral message 502 will be accessible within the context of the ephemeral message content collection 504. Accordingly, a particular ephemeral message content collection 504 may "expire" and become inaccessible within the context of the ephemeral message content collection 504, prior to the ephemeral message content collection 504 itself expiring in terms of the content collection duration parameter 508. The content collection duration parameter 508, content collection participation parameter 510, and message receiver identifier 424 each provide input to a content collection timer 514, which operationally determines, firstly, whether a particular ephemeral message 502 of the ephemeral message content collection 504 will be displayed to a particular receiving user and, if so, for how long. Note that the ephemeral message content collection 504 is also aware of the identity of the particular receiving user as a result of the message receiver identifier 424.

Accordingly, the content collection timer 514 operationally controls the overall lifespan of an associated ephemeral message content collection 504, as well as an individual ephemeral message 502 included in the ephemeral message content collection 504. In one embodiment, each and every ephemeral message 502 within the ephemeral message content collection 504 remains viewable and accessible for a time-period specified by the content collection duration parameter 508. In a further embodiment, a certain ephemeral message 502 may expire, within the context of ephemeral message content collection 504, based on a content collection participation parameter 510. Note that a message duration parameter 506 may still determine the duration of time for which a particular ephemeral message 502 is displayed to a receiving user, even within the context of the ephemeral message content collection 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message content collection 504.

The ephemeral timer system 1202 may furthermore operationally remove a particular ephemeral message 502 from the ephemeral message content collection 504 based on a determination that it has exceeded an associated content collection participation parameter 510. For example, when a sending user has established a content collection participation parameter 510 of 24 hours from posting, the ephemeral timer system 1202 will remove the relevant ephemeral message 502 from the ephemeral message content collection 504 after the specified 24 hours. The ephemeral timer system 1202 also operates to remove an ephemeral message content collection 504 either when the content collection participation parameter 510 for each and every ephemeral message 502 within the ephemeral message content collection 504 has expired, or when the ephemeral message content collection 504 itself has expired in terms of the content collection duration parameter 508.

In certain use cases, a creator of a particular ephemeral message content collection 504 may specify an indefinite content collection duration parameter 508. In this case, the expiration of the content collection participation parameter 510 for the last remaining ephemeral message 502 within the ephemeral message content collection 504 will determine when the ephemeral message content collection 504 itself expires. In this case, a new ephemeral message 502, added to the ephemeral message content collection 504, with a new content collection participation parameter 510, effectively extends the life of an ephemeral message content collection 504 to equal the value of the content collection participation parameter 510.

Responsive to the ephemeral timer system 1202 determining that an ephemeral message content collection 504 has expired (e.g., is no longer accessible), the ephemeral timer system 1202 communicates with the messaging system 100 (and, for example, specifically the messaging client application 104) to cause an indicium (e.g., an icon) associated with the relevant ephemeral message content collection 504 to no longer be displayed within a user interface of the messaging client application 104. Similarly, when the ephemeral timer system 1202 determines that the message duration parameter 506 for a particular ephemeral message 502 has expired, the ephemeral timer system 1202 causes the messaging client application 104 to no longer display an indicium (e.g., an icon or textual identification) associated with the ephemeral message 502.

Figure 6:
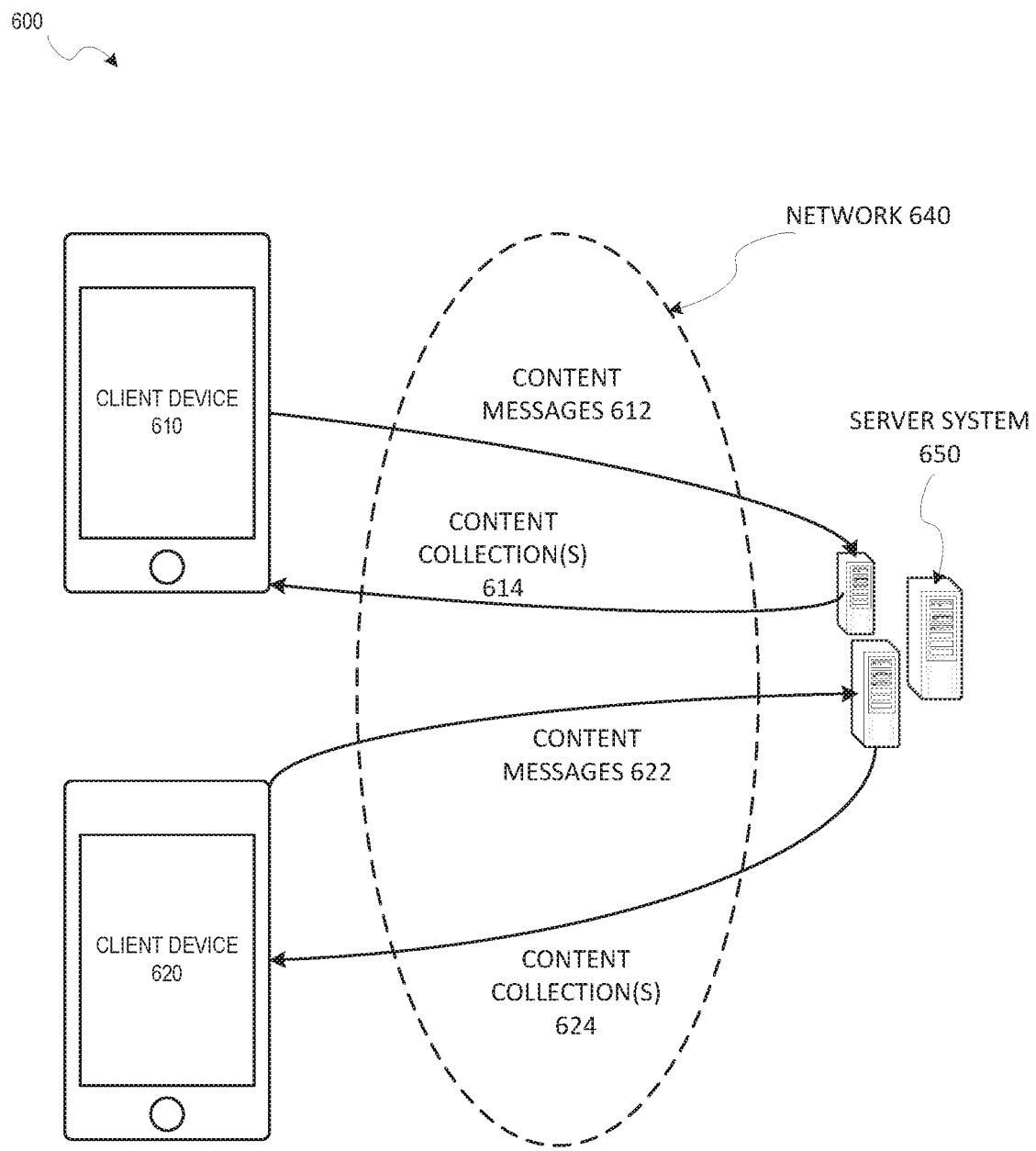
FIG. 6 illustrates a system for communicating content messages and content collections in accordance with some embodiments.

FIG. 6 is a block diagram illustrating a networked system 600, according to some example embodiments. System 600 includes client device 610, client device 620, server system 650, and network 640 that is used to convey communications between client devices 610 and 620 and the server system 650. Client devices 610 and 620 may be any smartphone, tablet, phablet, laptop computer, network-enabled camera, or any other such network enabled device. Client devices 610, 620 may include a camera device for capturing content, or may be coupled to a separate camera device that is used to capture the content prior to sending to other client device 610, 620 for storage. Some embodiments may therefore include wearable devices such as a pendant with an integrated camera that is coupled to a client device 610, 620. Other embodiments may include other associated devices with an integrated camera that may be wearable such as a watch, eyeglasses, clothing such as a hat or jacket with integrated electronics, a clip-on electronic device, or any other such devices that may communicate or be integrated with a client device 610, 620. Client devices 610 and 620 are connected to server system 650 via network 640. The network 640 may include any combination of wired and wireless connections. In some embodiments, client devices 610 and 620, as well as any elements of server system 650 and network 640, may be implemented using elements of software architecture or machine examples described below.

Networked system 600 then may be used in communication of content messages from client devices 610, 620 to a system 650, and communication of content collections from the system 650 to the client devices 610, 620. As shown in FIG. 6, client device 610 communicates content message 612 to server system 650, and client device 610 receives content collections 614 from server system 650. In some embodiments, content message(s) 612 include some or all elements of message 400 described above. In some embodiments, some elements of message 400 are included as part of communication of a content message 612, and another portion of the elements (e.g., story table 306, etc.) are added by server system 650 after the content (e.g., video, audio, text, or other such content elements) of content messages 612 is analyzed by the server system 650. Content messages 612 are thus processed and analyzed by server system 650 to generate content collections in accordance with the details below.

In addition to this functionality, used for the embodiments described herein, client device 610 may additionally receive private pieces of content and communications from other users, and may convey a personal content collection to server system 650, with the personal content collection including images and or video from content messages 612 generated by client device 610 or another device coupled to client device 610. Similarly, client device 620 sends content messages 622 and receives content collections 624, and may additionally perform other actions.

Figure 7:
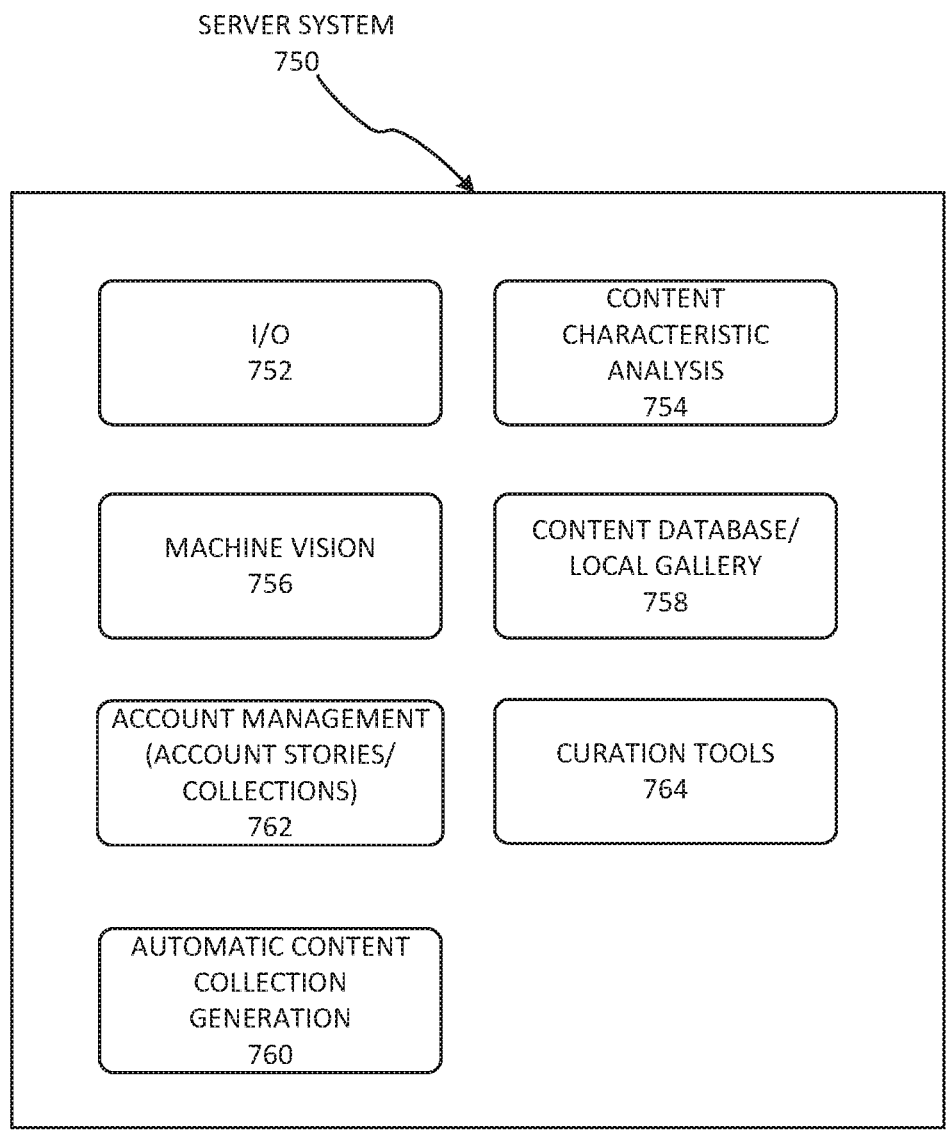
FIG. 7 illustrates aspects of systems and devices for image processing and content curation in accordance with some embodiments.

FIG. 7 illustrates aspects of a server system 750 for automated local content collection generation and curation, according to some example embodiments. In various embodiments, server system 750 may be used as an implementation of server system 650 or application server 112. The example server system 750 includes input and output (I/O) module 752, content characteristic analysis module 754, machine vision module 756, content database 758, account management module 762, automatic content collection generation module 760, and curation tools 764.

I/O module 752 may include any hardware, firmware, or software elements needed to send and receive content and content collections to client devices 102, or 610, 620, via a network 140. Content characteristic analysis module 754 may include devices, processors, and software to analyze images from pictures and frames of video clips, and then determine content characteristics, including details about when and where a picture or video was generated. In certain embodiments, content characteristic analysis module 754 may be implemented as a plurality of different modules, each analyzing a different content characteristic, including any content characteristic described herein.

Machine vision module 756 describes a particular module that may be used to identify content characteristics based on the content of an image or images in a video. Machine vision module 756 includes hardware, firmware, and/or software for analyzing and understanding content. In one embodiment, machine vision module 756 is associated with a dictionary comprising image and video content values. Objects identified in images of a piece of content and the arrangement of the identified objects therein may be used by machine vision module 756, in such an embodiment, to select one or more content values from the dictionary as content characteristics. For example, a simple machine vision module 756 may identify a ball in an image, and select the values "ball" and "game" as content characteristics. A more complex module may identify the type of ball as a basketball, and include "basketball" as a characteristic value. A still more complex machine vision module 756 may identify a basketball, a crowd, a court color, and an elevated perspective of the court to identify "professional basketball game" and "basketball arena" as content values for the content. The same complex machine vision module 756 may identify a basketball, a park background, and a concrete court surface and associate "amateur basketball game" and "playground basketball" as content values for the content that is illustrated as an example in FIG. 8. Such content values may operate as context values which are used to generate content collections as described herein. Other types of context values besides such content values, however, may be used to generate content collections without using content values, or in addition to such content values. For example, one embodiment of an image may have associated context data comprising location data (e.g. coordinates or a geofence), time data (e.g. a time of day, a day of the month, an hour, etc.) content values (e.g. trees, basketball court, a face, etc.) quality values (e.g. blur, exposure, brightness, contrast, etc.) or any other such values which are referred to herein as context data.

These content values generated by machine vision module 756 can then be stored in content database 758 along with other characteristic values. Such characteristic values can include: one or more content values (i.e., an identification of what's in the content); a generation time; a generation time period; a generation location; a generation area; one or more quality values; any metadata value associated with content; an identifier for a particular piece of content; or any other such values. In some embodiments, a copy of content may be stored in content database 758 with location information, capture time information, and any other such information about a piece of content. In certain embodiments, content database 758 may anonymously store details about content use. For example, client devices 102, 610, 620 can communicate details about presentation of the content on a screen of the device, and about screenshots taken of the content. Anonymous metrics about how often a piece of content is viewed as part of a content collection, how long the content is viewed for, and how frequently screenshots are taken may then be measured by server system 750, as part of analysis by content characteristic analysis module 754, with the resulting data stored in content database 758. In some embodiments, content database 758 may include this content information with any content or content message information discussed above with respect to FIG. 4 or in any database or table structure discussed above.

Account management module 762 includes application or interface functionality to enable users to manage entity/account relationships via communications between user devices and server system 750. Account management module 762 may also manage an individual user's content collections as described herein.

Curation tools 764 include tools available to system operators or advertisers to generate and present content collections from large amounts of content received at server system 750 and made available by user selection to be included in public content collections (e.g., live content collections, location content collections, content-based content collections, etc.). Similarly, automatic content collection generation module 760 may filter large numbers of received pieces of content to generate content collections grouped by location, time, topic, or on any other such basis. In some embodiments, elements of automatic content collection generation module 760 are used to filter the number of pieces of content provided to curation tools 764 to a smaller number (e.g., filtering 10000 received pieces of content to provide 700 pieces of content to curation tools 764 for review by system operators).

In some embodiments, automatic content collection generation module 760 may then use information about pieces of content from content database 758 to select particular pictures or videos for an automatically generated content collection. In various embodiments, automatic content collection generation module 760 may use complex scoring, weighting, and other rules in generating a content collection. For example, certain embodiments may function such that all pieces of content meet a quality threshold unless a trend having certain threshold characteristics is identified and all content associated with the trend are below the quality threshold. Another embodiment may weight content collection generation based on a number of content collections currently available in a local geographic area. In still further embodiments, any number of complex rules may be applied together as part of content collection generation to filter images and videos for a content collection based on time, location, content, and quality.

In some embodiments, quality scoring within automatic content collection generation module 760 may be used to filter or select pieces of content for a particular content collection and to filter different content collections for presentation to a user. A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such matters. For video where multiple sample frames are analyzed, an average of scores for each frame may be used to select a score, a worst score for an individual frame of all the analyzed frames may be used, or any such combination or function of multiple scores or selections of scores may be used.

In some embodiments, motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video-based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio-based information, may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used for a quality score or a quality threshold flag, in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g., landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score.

Feedback or machine learning is used, in certain embodiments, to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image quality features and image content features. In some embodiments, learnable filters may be selected and automatically updated based on a database of images from image processing services used for content analysis of images or video frames. In other embodiments, any other such sources may be used for learnable filters. Such analysis may be applied to both image elements of content as well as to audio elements of videos.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night. Further, aggregated interest and quality scores for complete sets of content collections (e.g., balanced or weighted scoring for pieces of content within a content collection) are used to sort and select content collections for presentation to a user.

Figure 8:
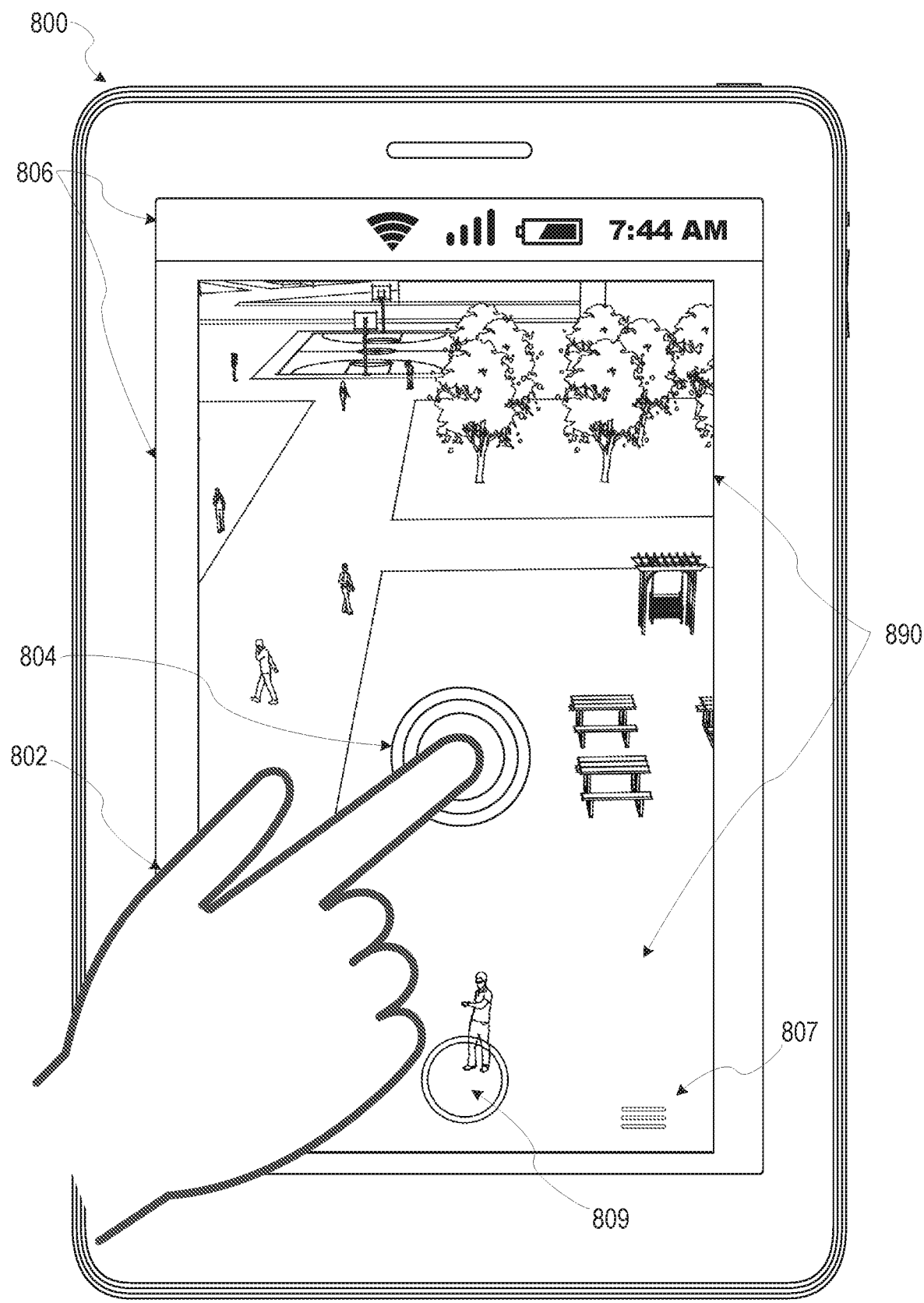
FIG. 8 illustrates aspects of a device for generating and displaying content in accordance with some embodiments.

FIG. 8 shows aspects of a user interface for a message device 800 that may be used as part of a system as described herein. FIG. 8 shows message device 800 with display area 806, which is a touch screen operating as both an output display and an input device. Device 800 may be used to capture content, which is then processed and analyzed as part of curation for a content collection. The content illustrated in display area 806, for example, may be processed by the machine vision module 756 to identify a basketball, a park background, and a concrete court surface and associate "amateur basketball game" and "playground basketball" as context values for the content. Depending on other context values, such as location data, the context may be identified as "school" or "park" or "university".

In addition to various user interface elements, display area displays image 890 (e.g., the image 890 for content generated by the device 800), which includes both image data from a camera of device 800 as well as image capture user interface elements. Interface 807, for example, provides input options to send messages. Interface element 809 may be used to initiate capture of content (e.g., images or video clips) using the camera. Such content may then be analyzed locally as part of local organization or search within a gallery of content stored on the device 800 in accordance with the embodiments described herein. In other implementations, content generated on device 800 is communicated to a server system and analyzed at the server system as part of image processing and content curation operations in accordance with the embodiments described herein.

As described above, the piece of content associated with image 890 is processed in various embodiments and then analyzed as part of automated content curation.

Figure 9:
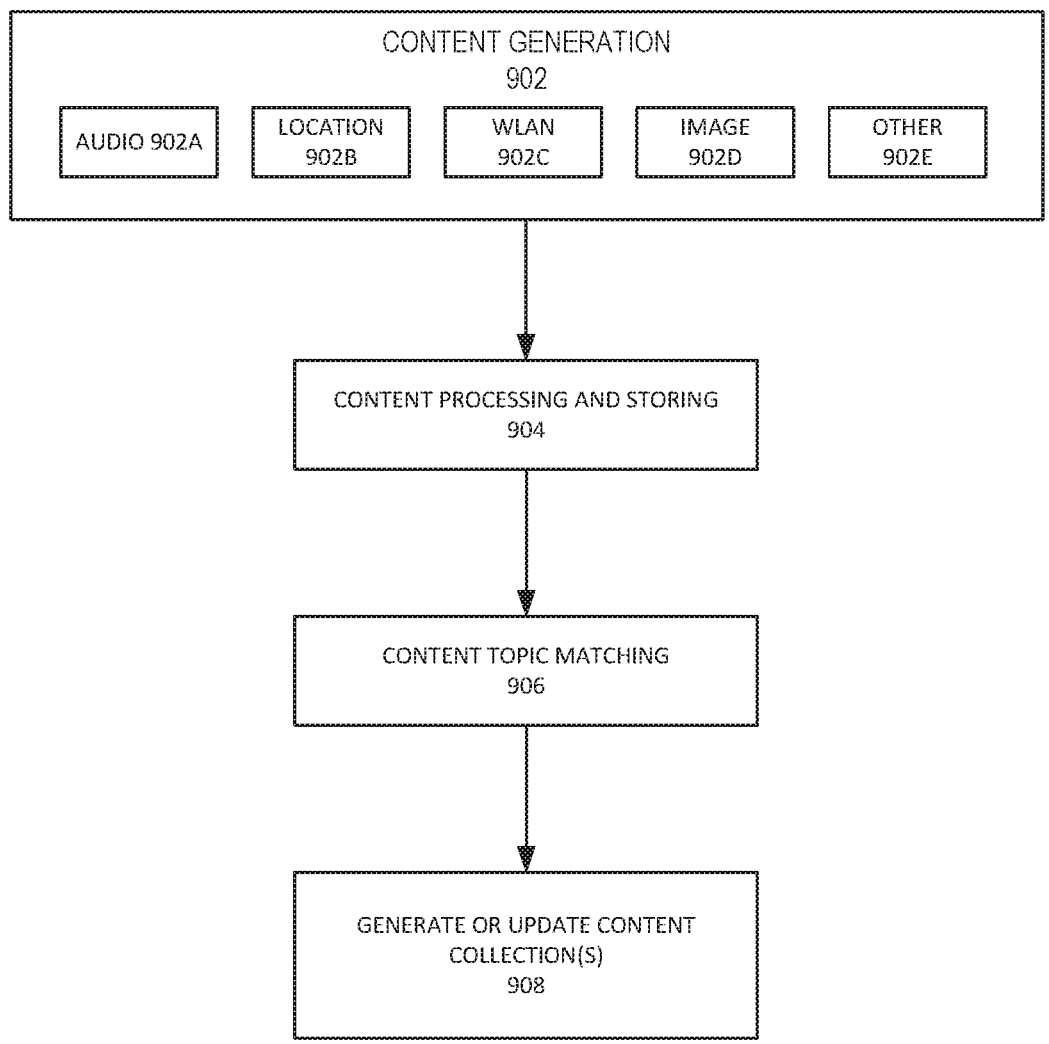
FIG. 9 illustrates aspects of operations for image processing and content curation in accordance with some embodiments.

FIG. 9 then describes aspects of device actions to curate content collections using image processing and image search. In operation 902, content, such as the content for image 890, is captured at a device. The content capture may involve creation of multiple different types of data, including audio data 902A, location data 902B, wireless local area network (WLAN) data 902C, image data 902D, or other data 902E. Audio data 902A may be any data recorded by a microphone at the device, and may include data from sound output by a speaker of the device operation 902. Location data 902B may include any location data from a device, including network assisted location information, global positioning system (GPS) or global navigation satellite system (GNSS) data, accelerometer data, map data, or any other such data related to location and movement of the device performing the content generation. Wireless LAN data may include information about available wireless connections on any number of different wireless protocols, including Bluetooth signals, near field communication signals, Wi-Fi signals operating according to Institute of Electrical and Electronic Engineering (IEEE) communication standards, or any other such signals. For example, in some environments, a business may offer a device access to an access point for network connectivity, with the access point having an identifier that describes the business. The identifier may be used as content metadata, and may be matched to the business name with an associated triggered action as described herein. Image data 902D may be images, video clips, or other information from a camera within the device performing the content capture. Other data 902E may be any information generated by any sensor or I/O component of the device performing the content capture. Such data is then analyzed in any fashion described above, to generate scores and context values for the content. The resulting data is then formatted and stored within a system in operation 904.

As content data and metadata is captured, it may be processed in a number of different ways, and may then be matched against system patterns or topics in operation 906. In some embodiments, for example, a system may have general topics which are used to generate search spaces for content curation. One system may, for example, sort content into "object," "life," "sports event," "music event," or "other" topics. Various systems may use any number of such topics or context sorting values. Some systems may include multiple tiers of topics or patterns, where context information is matched to system patterns that are used for content collections.

In some embodiments, this may be as simple as matching content metadata text against a stored text pattern. For example, if an identifier for an access point or a machine vision output includes the word "coffee" and the word "coffee" is a pattern in the system for matching, then a match is identified. Other matches of content data against system patterns may be more complex.

In some embodiments, image search using images from content generation operation 902 is part of an analysis of content data performed to assist with content data pattern matching operation 904. In other embodiments, however, image search and matching with existing content items may be performed automatically with content generation operation 902. The image search operations may be used to enhance the pattern matching performed by a client device working with a server to implement image processing and curation as described herein. Image searching refers to systems which accept images as input, and output related information. In some embodiments, a matching score may be generated and used in any analysis process described herein. Such systems may also return either keyword information describing the information in the image, other similar images, or both. For example, an image search system may accept an image of a cat, and may provide the word "cat" as a response along with other images of similar cats. Some embodiments of image search may include other more detailed information, such as a breed of the cat, a color of the cat, or other detailed information about the environment of the image. Any image processing system described herein may use an independent image search system to process images, generate output information about the images from the search, and store this image search information as context data for a piece of content to be used with content curation.

In operation 908, any match identified during operation 906 may be used to generate or update a content collection. For example, in one embodiment, when generating a content collection based on a particular piece of content, after the content is matched to a topic in operation 904, then all pieces of content within a search space (e.g., within a two mile radius and a two hour time range) are analyzed for similarity using image content (e.g., visual similarity), distance, time, or any other system criteria. If a sufficient number of pieces of content are identified, then a content collection is generated. In some embodiments, if not enough similar pieces of content are found, the criteria for the search space is expanded until sufficient content is identified to generate a collection.

In some embodiments, the criteria within a search space (e.g., different quality or content values) are weighted differently within different topic categories. For example, "life" and "object" content may be matched to content within larger distances. "Object" content may have more strict visual content matching requirements, while "life" content may have more strict time requirements. "Sport event" or "Music event" may have specific time windows and visual match criteria associated with a specific event in a specific place, so that content from a specific event will be matched with content from the same event to generate a content collection for an individual event.

As described herein, such collections generated based on topic matching along with other content data matching may be performed automatically to generate a content collection using machine processing of content. In some embodiments, such an automatically generated content collection can be reviewed and edited after it is presented to some users. In some such embodiments, user feedback on particular pieces of content is used to adjust or update a content collection over time. For example, as new pieces of content are received, the matching process above may be performed, and pieces of content swapped out based on quality scores, user feedback, or any other such system information related to a content collection.

When a user accesses a content collection on the user's client device, the user can view the content as part of the content collection and select an individual piece of content from a content collection. When a piece of content is selected from the content collection, this selection is communicated to the system. The system then provides the device with a content collection based on the content characteristics of the selected piece of content. This process can continue with the user selecting another piece of content from the content collection, with a resulting subsequent content collection being sent to the user's client device. A provided user interface allows a user to navigate back to any earlier viewed content collection, and to continue viewing additional pieces of content from the earlier content collection. At any point another piece of content can be selected, resulting in an additional content collection associated with characteristics of the newly selected content.

In certain embodiments, anonymous information about content collection viewing, selection of pieces of content within an individual content collection, and screenshotting of content on a client device is fed back to the system to influence the system trends that impact how content collections are assigned to user segments. This feedback mechanism can also be integrated with the system trends associated with incoming pieces of content mentioned above to influence the selection of pieces of content for future content collection generation (e.g. when a content collection is generated or not generated). Certain embodiments of such a system may periodically assess newly received content to determine which pieces of content best represent certain system categories associated with a content collection. As new content messages associated with a content collection are received by the system, they may be added to a content collection, or used to update or replace some previously received pieces of content in a content collection.

In one embodiment a sports arena may be assigned a geofence. During a basketball game at the arena, users capturing content inside the arena have the option of sending content messages to the system for public use in content collections. The system analyzes the pieces of content received and generates one or more content collections for the system users inside the arena. The system may, for example, simply generate one content collection for the local geographic area that includes a mix of pictures and videos of the game and of fans attending the game.

A user can then navigate to view content within different content collections. For example, if a user has access to the content collection from the arena, and the content collection includes a picture or video of a game-winning play from the arena, the user may select this content. The system then generates a content collection for the user based on the characteristics of this content. For example, the generated content collection may include pictures or videos showing gameplay highlights. If a user selects content from this content collection showing a player dunking, a second content collection may be generated and sent to this user showing pictures or videos of this player generally as well as other content showing dunks with other players. Selecting a piece of content from the second content collection including the same player may result in a third content collection that includes only content featuring the selected player. Selecting a second content collection picture or video showing a different player dunking may result in an alternate third content collection with content showing dunk highlights from the entire basketball season. Any screenshots of pictures or videos taken by the user, along with viewing time, percentage of pictures or video in a particular content collection viewed, or other such metrics can be sent to the system as feedback to establish baseline values for these metrics and to identify trends and influence a current user segment assignment for related content collections as well as system operations for the generation of future content collections.

Figure 10A:
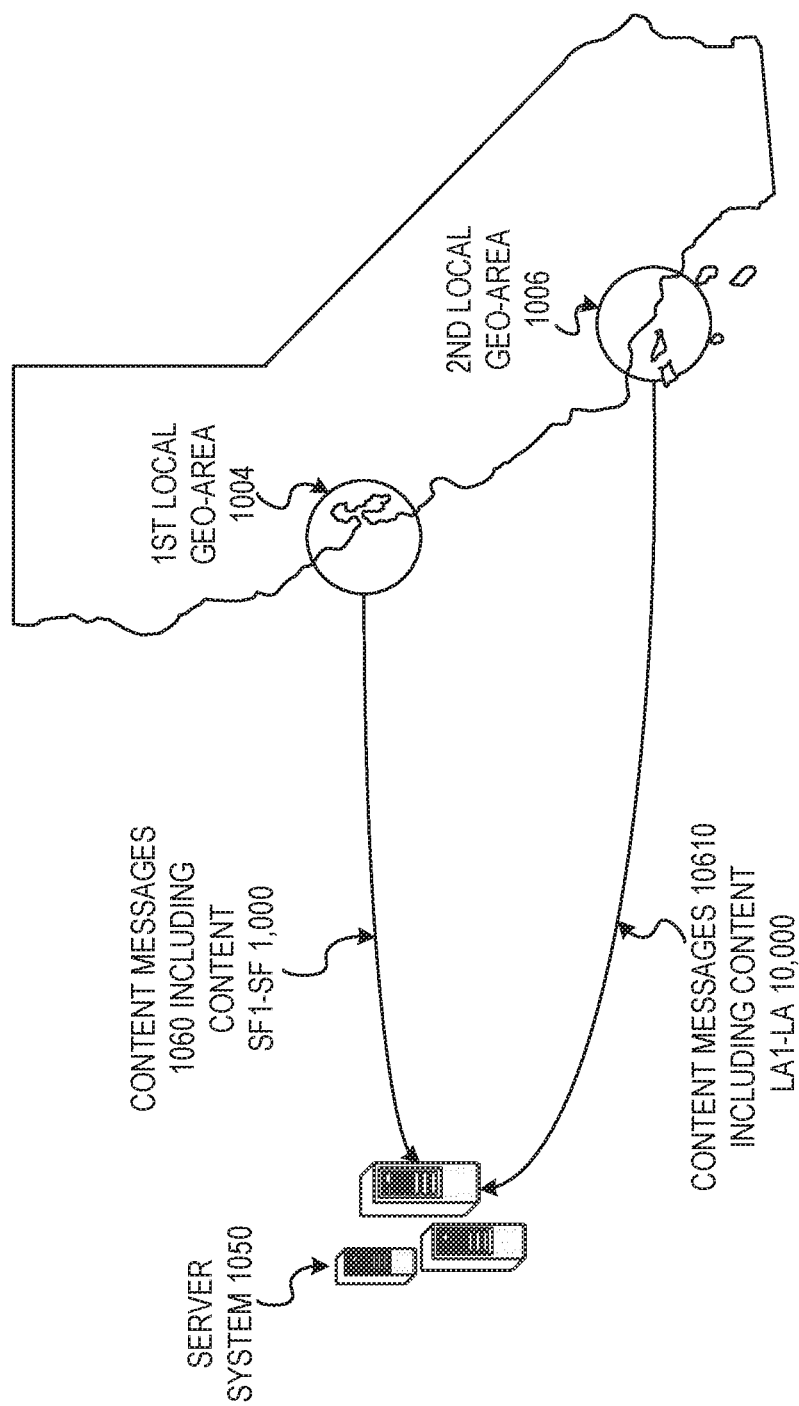
FIG. 10A illustrates aspects of server system operation receiving content for different geographic areas, in accordance with certain example embodiments.
Figure 10B:
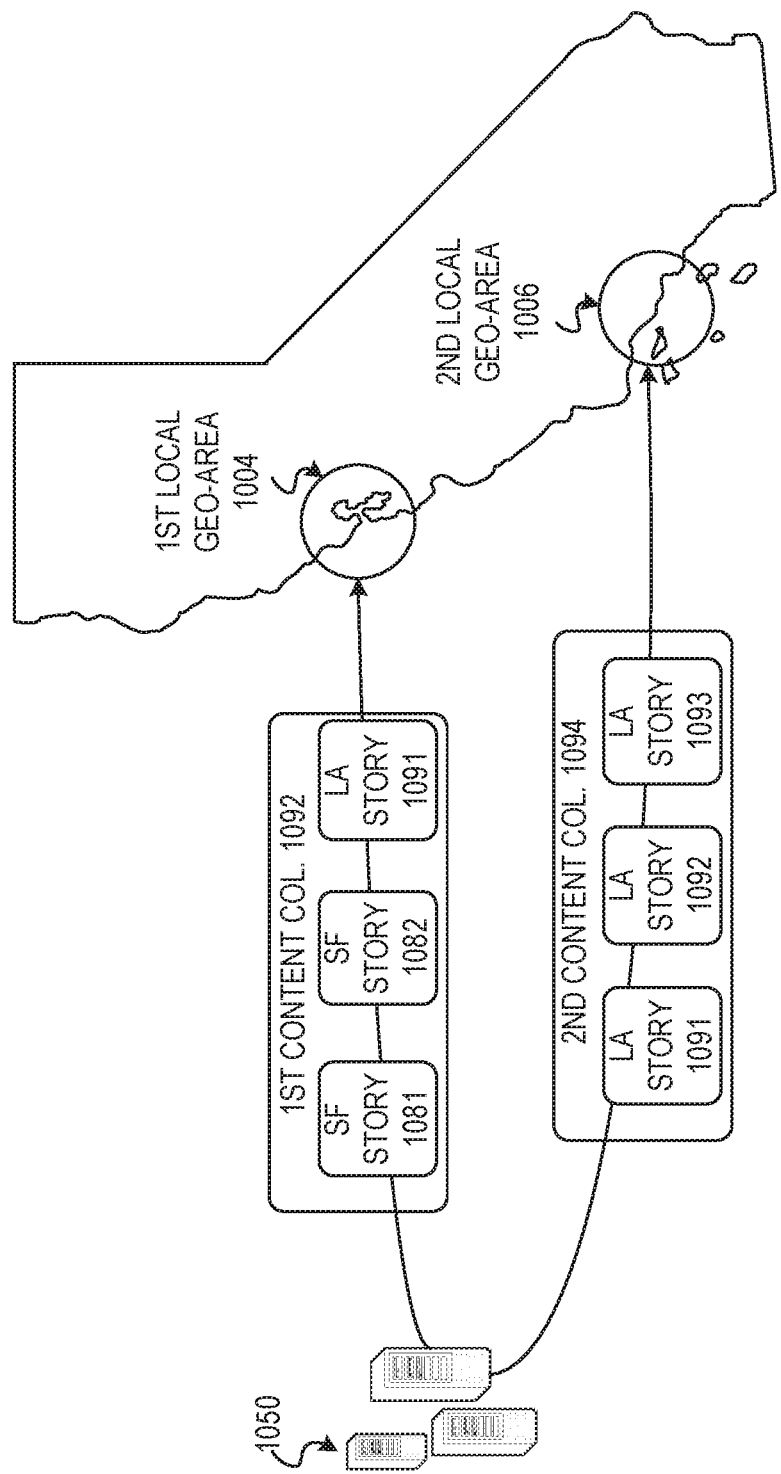
FIG. 10B illustrates aspects of server system operation sending different stories to different geographic areas, in accordance with certain example embodiments.

FIG. 10A illustrates aspects of server system 1050 receiving content messages from different geographic areas in accordance with certain example embodiments. FIG. 10B illustrates aspects of server system 1050 sending different content collections to different geographic areas in accordance with certain example embodiments. In contrast to FIG. 1 that shows two client devices 102, FIGS. 10A-B show an abstract of the client side of a system where thousands or millions of client devices in different areas may be interacting with a server system 1050.

Instead of individual client devices FIGS. 10A and 10B show a simple user segment representation with two local geographic areas 1004 and 1006. A single local geographic area may be a public park, multiple city blocks, a university campus, a sports area, a shopping mall, a beach, a single building, or any such local area. In certain embodiments, geofences are used to define local areas. Such geofences may be tracked by aspects of a network system 100 including location systems within client devices, network based location systems as part of network, separate location systems such as global positioning systems (GPS), or any combination of these or other location systems.

In other embodiments, rather than considering set geofences or groups of users, a system may generate content collections for each client device individually. In such an embodiment, whenever a user navigates to a content collections interface within an application operating on a client device, the client device communicates a current location to the server system 1050. The location of the device or other device provided information at that time can be used to generate a list of content collections for the device.

In the illustrated example of FIG. 10A, the client devices within first local geographic area 1004 are grouped together and communicate 1000 content messages 1060 to server system 1050 in a first time period. The content associated with these content messages is shown as SF1 through SF1000. During the same time period, 10000 content messages 1062 containing individual clips or images are sent to server system 1050 by client devices within the second local geographic area 1006, illustrated as content LA1 through LA10000. This volume of content is sufficient to overwhelm an individual user. Therefore, server system 1050 operates as a curator to filter the content messages and provide a select set of the pictures and videos from the content messages as one or more content collections.

In various embodiments, this curation function may be fulfilled by a server system 1050 in different ways. At a high level, one example embodiment segments users by local area. Content collections for a client device are generated from the most recent content messages that were generated in the client device's current local area. Such local content messages for a content collection can further be filtered based on image quality and image content. Image content may be used to prevent excess content duplication, to provide a variety of different content, to provide content identified as newsworthy (e.g. images associated with famous people), or based on any other such content filtering selections. Image content may also be analyzed to identify content duplication, and to avoid placing extremely similar content (e.g. videos of the same event from similar angles) in a single content collection. Additionally, the server system 1050 can analyze trends associated with incoming content messages from other local areas to generate content collections based on the trends identified by the system. Additional details related to server curation and content collection generation are discussed below with respect to FIG. 6.

FIG. 10B then illustrates a first content collection set 1092 being made available to all client devices within the first local geographic area 1004. Similarly, second content collection set 1094 includes content collections visible to all client devices within the second local geographic area 1006. Second content collection set 1094 is shown as including three content collections, with all three content collections generated from content messages originating in the second local geographic area 1006. These content collections of the second content collection set include LA content collections 1091-293. First content collection set 1092 is shown as including two content collections generated from content messages originating within local geographic area 1004, SF content collection 1081 and SF content collection 1082. First content collection set 1092 also includes a content collection generated from content messages originating within local geographic area 1006, LA content collection 1091. As described above, LA content collection 1091 may be identified by server system 1050 analyzing system trends, where a larger than normal number of content collection views, screenshots, incoming additional content messages, or other system trends identify LA content collection 1091 as a content collection to be made visible to a larger user segment.

Figure 11A:
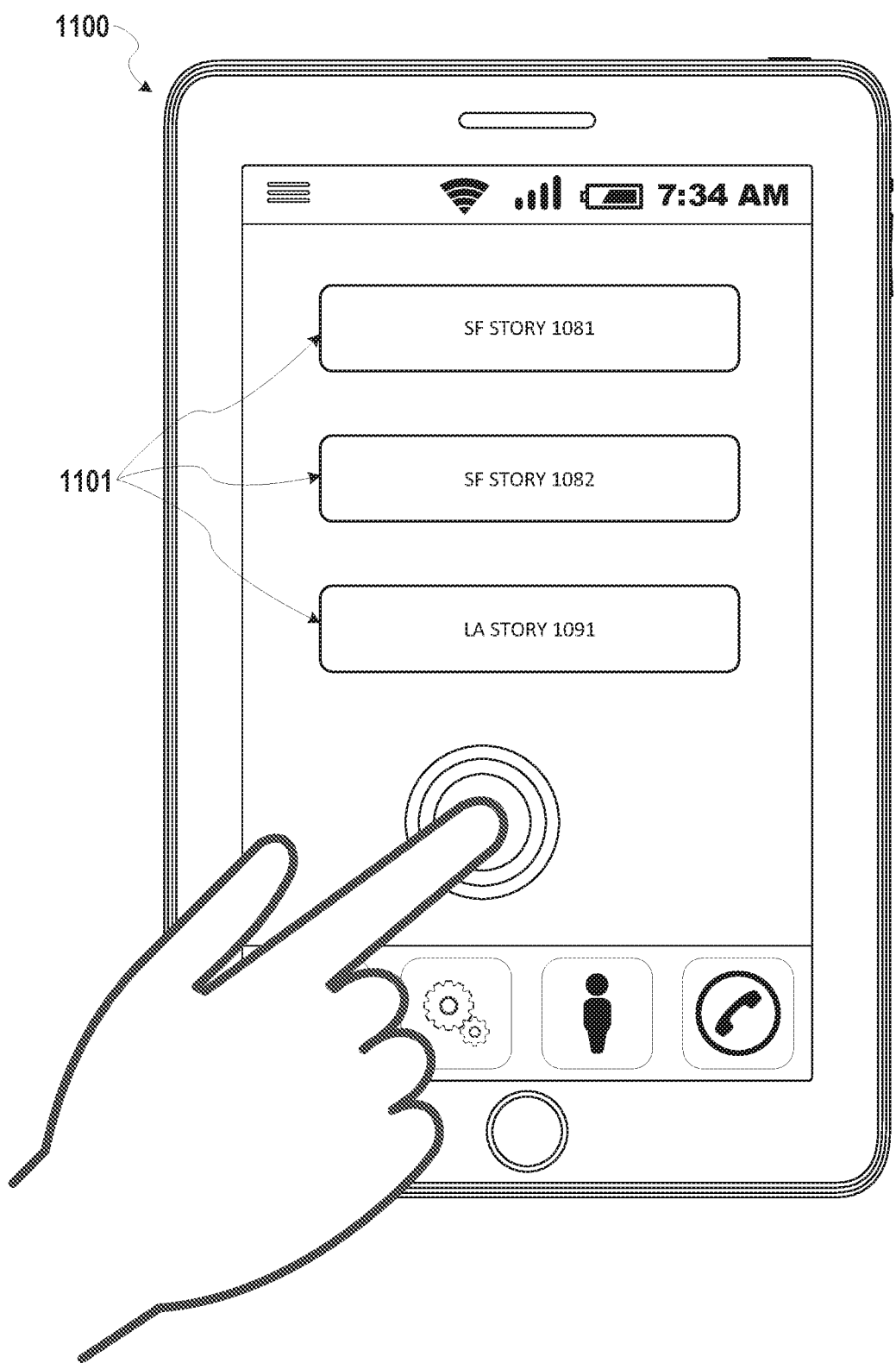
FIG. 11A illustrates aspects of content curation and content navigation, according to some example embodiments.

FIG. 11A illustrates an embodiment of a user interface for a client device 1100. Client device 1100 shows user selectable interface areas 1101 for each content collection in first content collection set 1092, including SF content collection 1081, SF content collection 1082, and LA content collection 1091. Additional content collections interface areas may be provided by scrolling up and down. Each interface area may provide basic details or sample images associated with each content collection. In certain embodiments a content collection or part of a content collection may be provided to client device 1100 prior to a selection of an interface area 1101. In other embodiments, images of a content collection are communicated from a server system such as server system 1050 following selection of a particular interface area 1101.

Figure 11B:
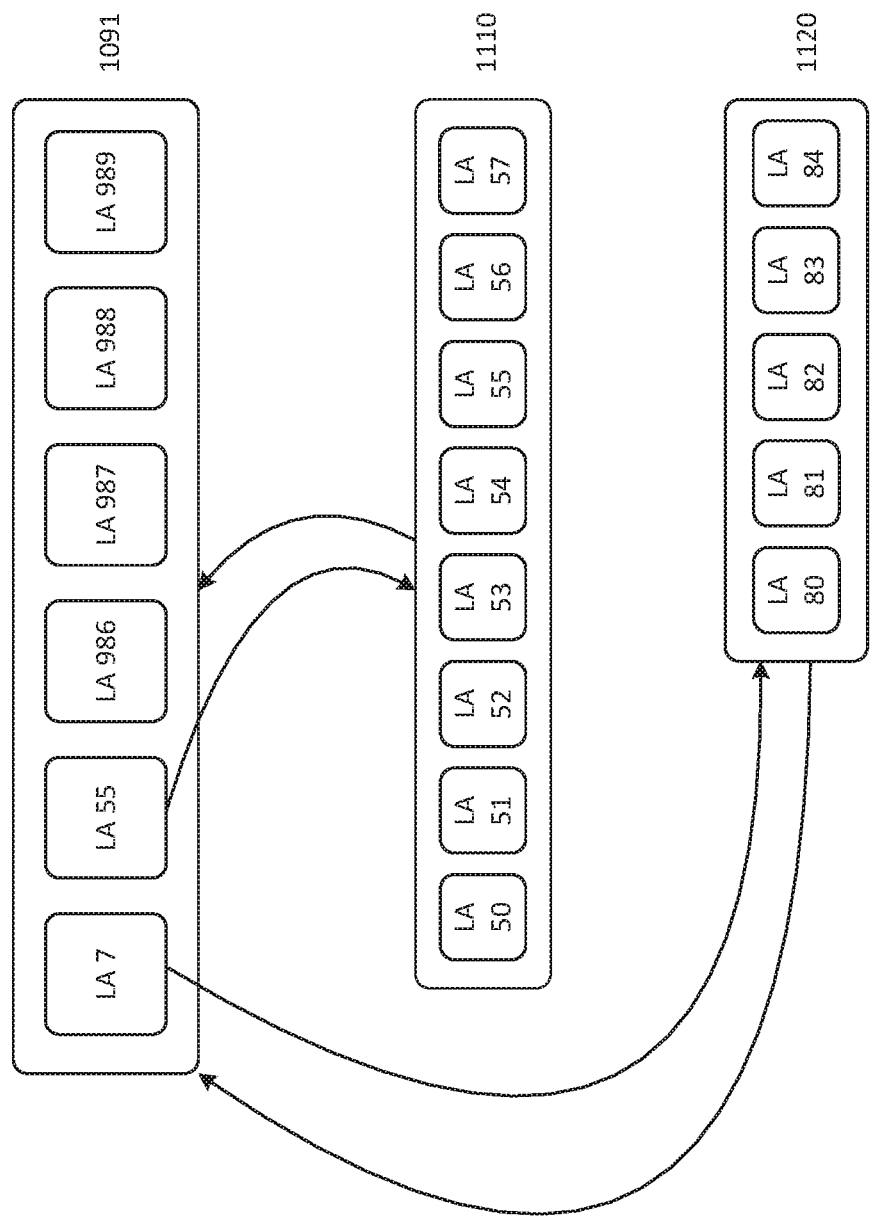
FIG. 11B illustrates aspects of content curation and content navigation, according to some example embodiments.
Figure 11C:
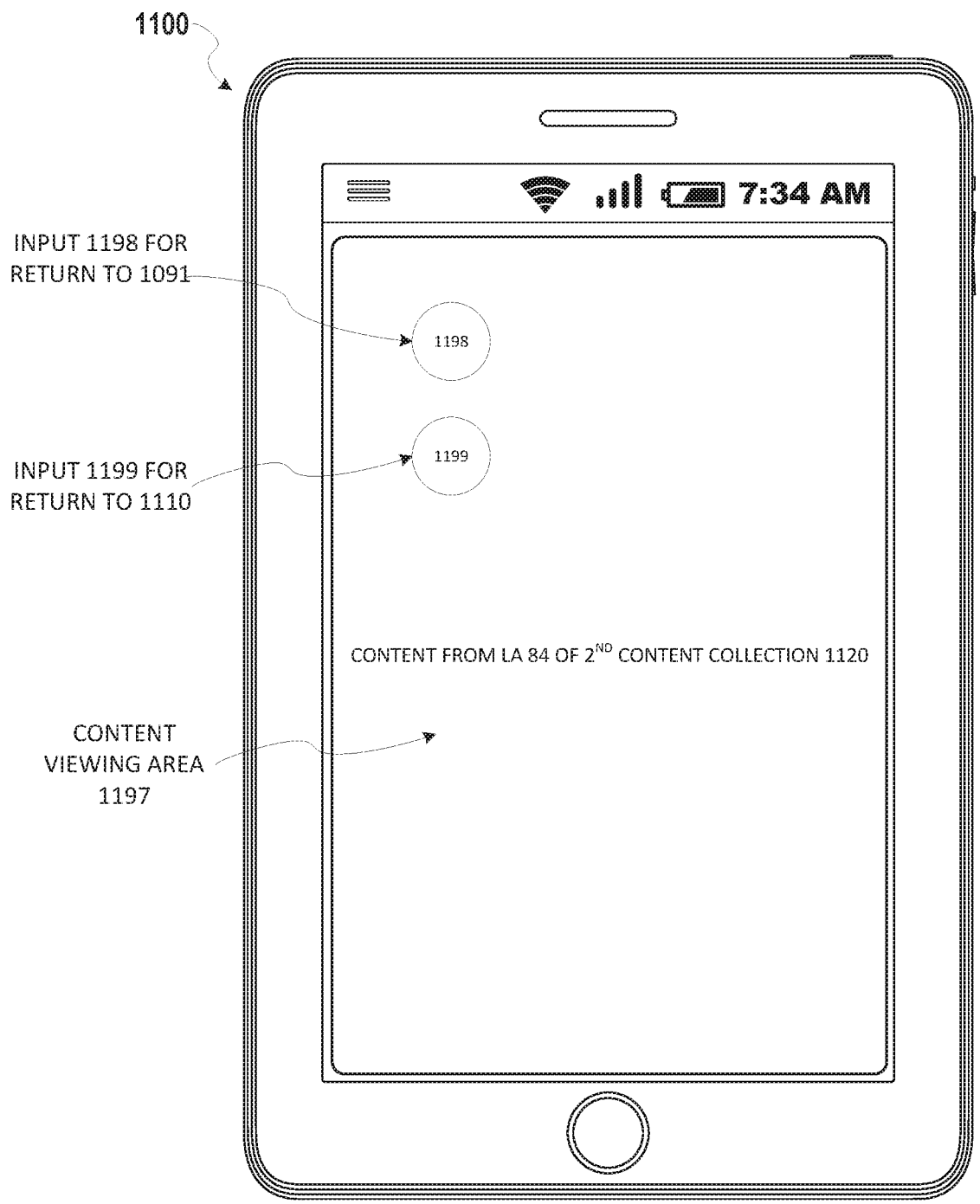
FIG. 11C illustrates aspects of content curation and content navigation, according to some example embodiments.

FIG. 11C illustrates one embodiment of an interface for viewing content collections and content collections such as the content collections shown in FIG. 11B. In FIG. 11C, when a content collection or content collection is received for viewing on device 1100, an individual piece of content is displayed within content viewing area 1197. In the embodiment of FIG. 11C, a user has navigated to content LA 84 (either image or video) of second content collection 1120. Input areas are visible for a return to previously navigated content collections. As shown, input 1198 is available to switch to LA content collection 1091, and input 1199 is available to switch to first content collection 1110. If either input 1198 or 1199 is selected, the first picture or video of the selected content collection will be displayed within content viewing area 1197. The viewer may then view some or all of the pieces of content within a content collection, and may either navigate to a new content collection by selecting the picture or video displayed in content viewing area 1197, or may return to a previous content collection. In further embodiments, a user may navigate between various content collections and content collections using other user interface inputs. For example, a user in a content collection may swipe up on content displayed on a device to return to a previously viewed content collection in some embodiments. Similarly, if a user has previously navigated back to a previously viewed content collection by swiping up, some embodiments may enable a swipe down user input to navigate to a content collection. Other embodiments may use drop-down menus or menu lists of recently viewed content collections that are accessed by a physical button on a client device to enable navigation between multiple different content collections and content collections.

FIG. 11B then illustrates aspects of content collection generation according to some example embodiments. After a content collection is selected by a user interface action with an interface area 1101, a content collection is displayed on client device 1100. A user may then view various content collections and sub content collections. FIG. 11B shows LA content collection 1091, which may be selected from the interface area 1101 of FIG. 11A. Following such a selection, pieces of content from LA content collection 1091 may be viewed. As illustrated, LA content collection 1091 includes images or videos from content messages including content LA 7, LA 55, and LA 986-989. As an image from content LA 55 is displayed on a screen of device 1100, the user may select the image from content LA 55. This selection is communicated from client device 1100 to a server system, and the server system responds with first content collection 1110. First content collection 1110 includes videos or images from content LA 50-LA 57 having characteristics similar to one or more characteristics of content LA 55. After viewing some or all images of first content collection 1110 in an interface similar to the interface shown in FIG. 11c, the user may navigate back to LA content collection 1091. When viewing video LA7, the user may then select image LA 7, and second content collection 1120 will be received from the server system in response to the selection of image LA 7. The user may then view some or all videos or images from content messages LA 80 through LA 84 of second content collection 1120 before navigating back to viewing the content of LA content collection 1091.

For example, if LA content collection 1091 includes videos of flooding and image LA 55 shows flood water in a local geographic area, a communication of this selection is sent to server system 1050. Server system 1050 then responds with a first content collection 1110 having content that share content characteristics with the selected image LA 55. In this case, all content associated with content messages LA 50 through LA 57 may include pictures or videos showing a specific area from different angles, as well as older pictures or videos of the specific area before the flooding occurred.

The user may then return to the original content collection to continue viewing content in LA content collection 1091, and may select an additional image or video within LA content collection 1091. If the user then selects a video from content message LA 7 of a dog walking through the flood water of the event that initiated the creation of LA content collection 1091, then this selection is communicated to server system 1050, and the server system 1050 responds with second content collection 1120. Based on the video of the dog and the flood water images from content messages, LA80-LA84 may include images or videos of dogs. This process can be recursive, such that a user can then select an image or video within a content collection, and receive an additional content collection. For example, if a user selects an image or video from content communication LA80 showing a particular type of dog, then another content collection may be received including content including that type of dog from different times or from other areas. If a user selects a piece of content from content communication LA84 showing a video of dogs playing around flood water, then another content collection may be generated showing only dog content with dogs playing around water.

Figure 11D:
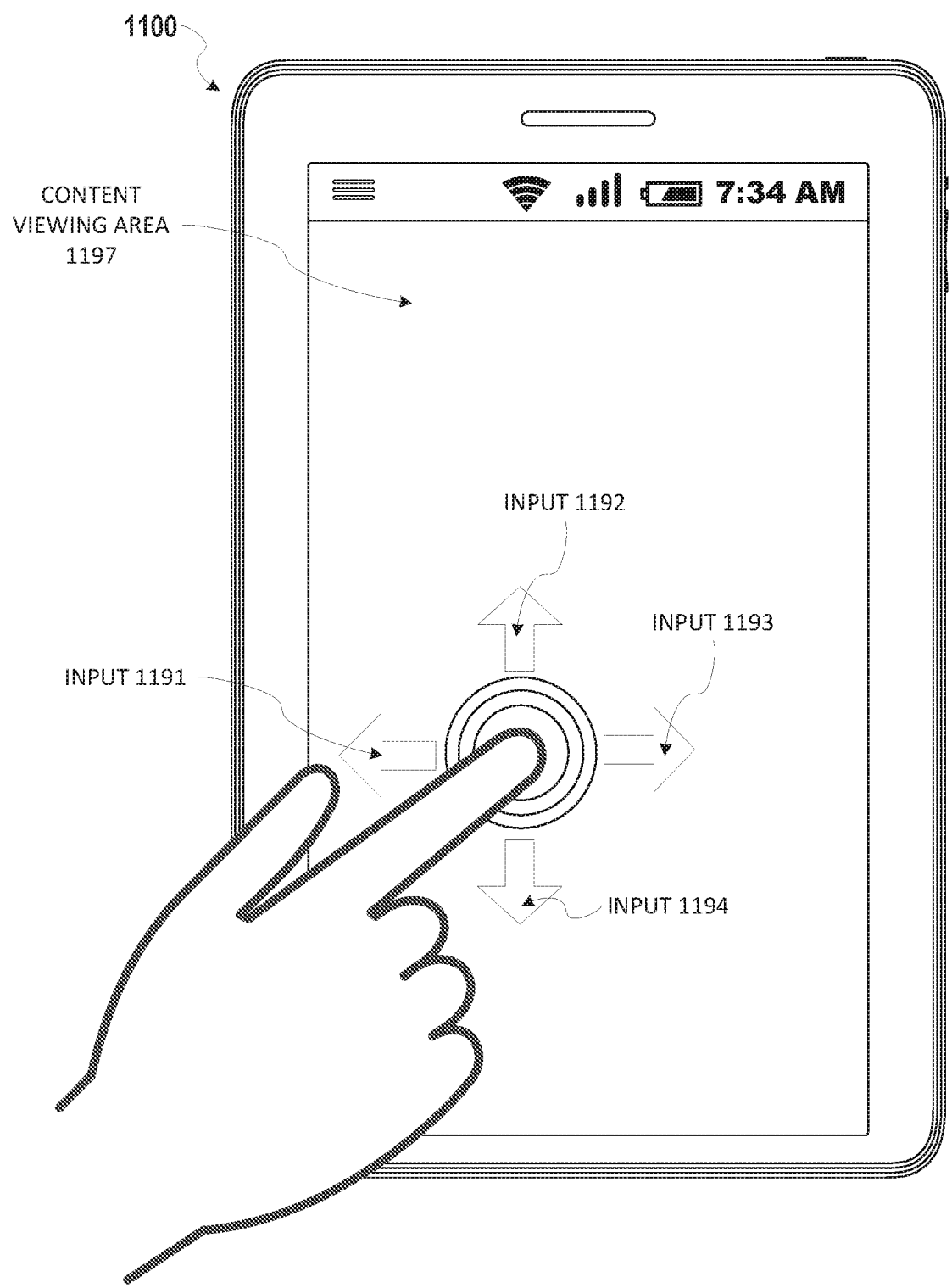
FIG. 11D illustrates aspects of content curation and content navigation, according to some example embodiments.

FIG. 11D shows another example embodiment of aspects of user inputs for navigating through content collections. In the embodiment of FIG. 11D, tapping on a right side of a touch screen display advances to a next piece of content before the content display period ends. Tapping on a left side of the display causes the piece of content displayed just prior to the piece of content being currently displayed to be displayed again. Such tapping may thus allow a user to navigate forward and backwards through individual pieces of content. Similarly, swiping from left to right as input 1193 may move to the first piece of content of a content collection presented just prior to a current content collection, and swiping right to left as input 1191 may cause the beginning of a next content collection to begin displaying. As a piece of content displays after a user navigation input, the display time for each piece of content is used to automatically advance between pieces of content, and then to a new content collection after a final piece of content is displayed. Swiping up as input 1192 may return to the content collection selection interface of FIG. 11A, and swiping down as input 1192 may provide a navigation interface to select a new content collection that is curated based at least in part on the context values associated with the currently displayed piece of content within content viewing area 1197.

Figure 12A:
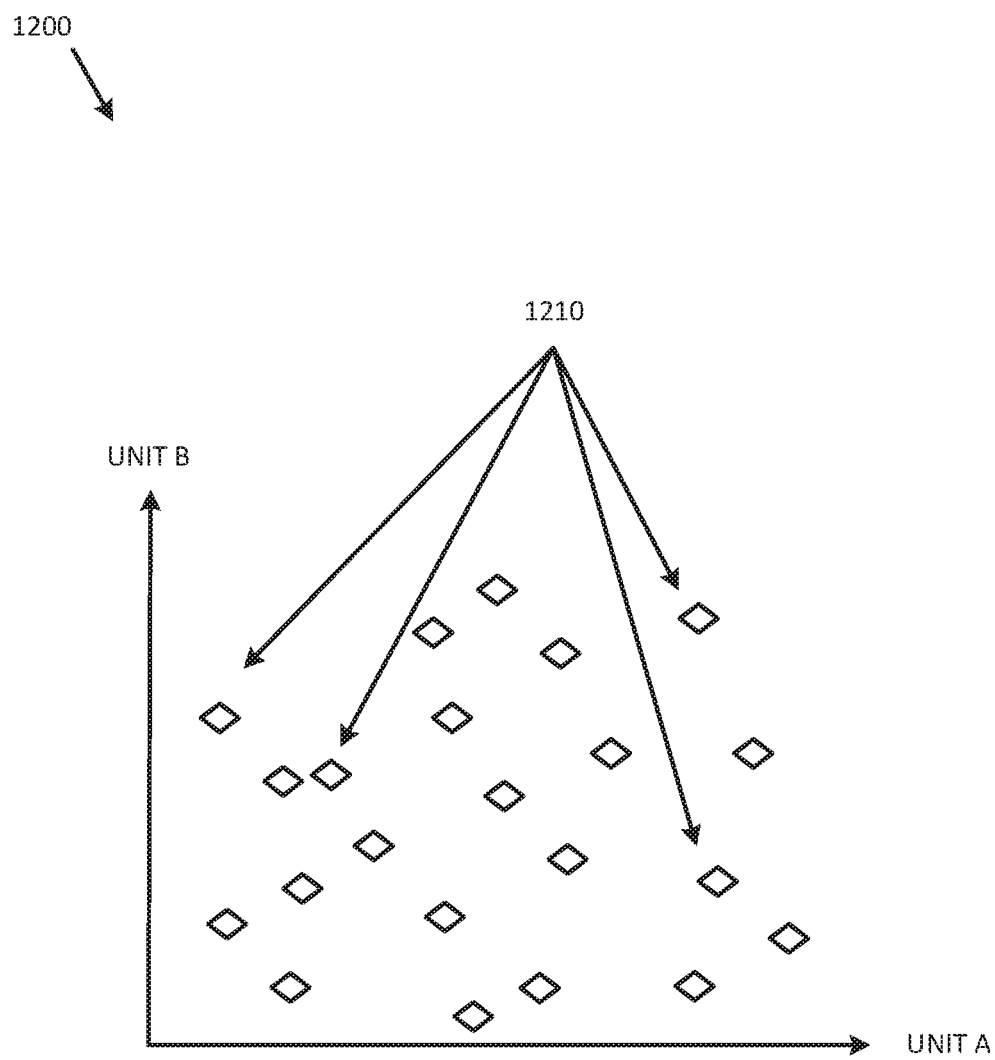
FIGS. 12A-C illustrate aspects of operations for curation of content in accordance with some embodiments.
Figure 12B:
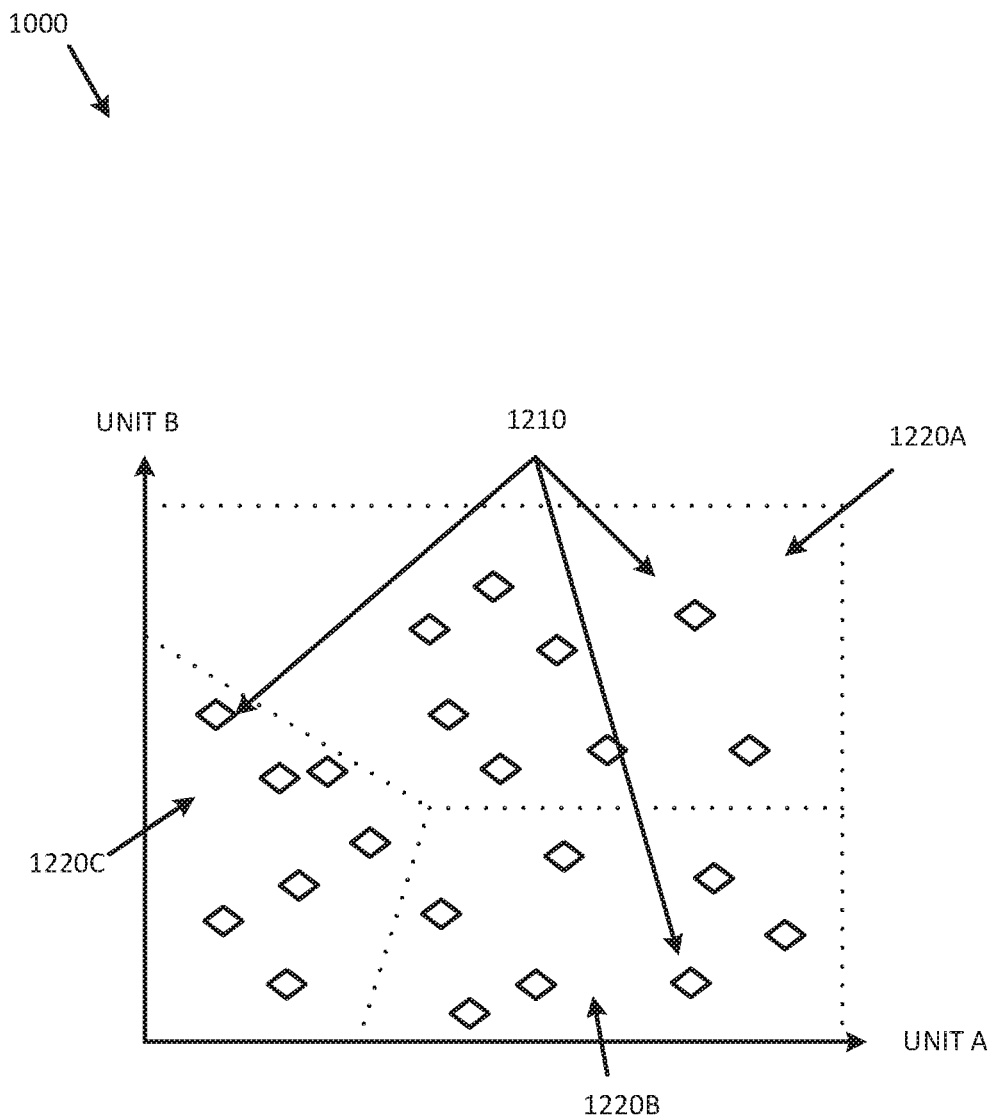
Figure 12C:
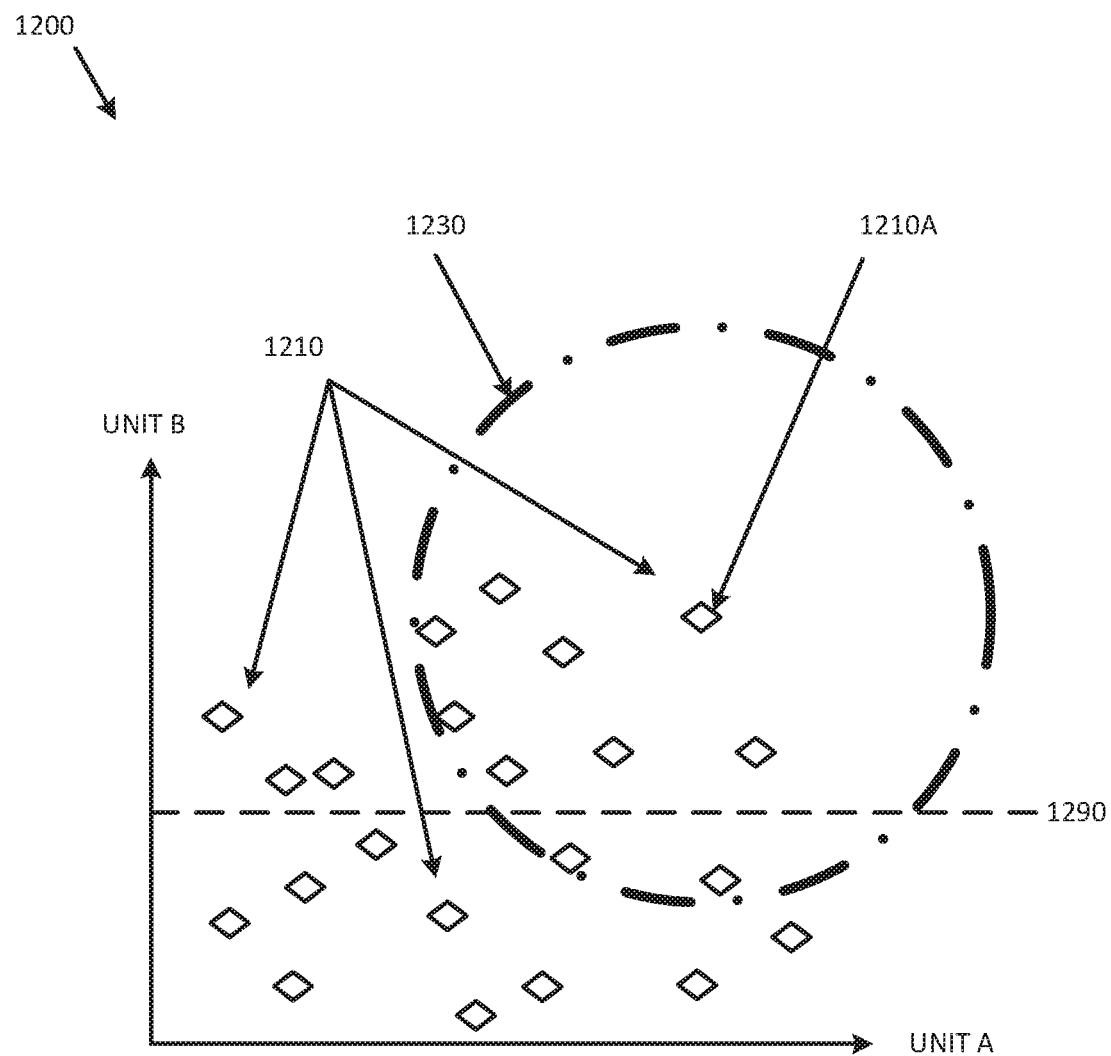

FIGS. 12A-C illustrate additional aspects of curating content according to some embodiments. FIG. 12A illustrates a representation of database content 1200 which is a search space for a potential content collection. The database content 1200 is made up of pieces of content 1210. As described above, individual pieces of content are associated with different content data. Such content data may be analyzed to generate quality, context, or other such data for a piece of content. One system, for example, may have (location, quality, time) as elements of data associated with each piece of content. The example of FIG. 12A shows a chart for another system that has elements (UNIT A, UNIT B) associated with each piece of content 1210 within the system. Pieces of content 1210 may be all pieces of content that have been matched with a particular topic, or may be all pieces of content within a system.

In some embodiments, k-means clustering is used with such data to identify clusters of content for grouping into content collections. FIG. 12A shows a basic chart of UNIT A and UNIT B for pieces of content 1210. FIG. 12B shows the pieces of content 1210 clustered into three sets S, shown as 1220A, 1220B, and 1220C. To perform such clustering, each piece of content 1210 is assigned to the cluster set 1220 whose mean yields the least within-cluster sum of squares. Since the sum of the squares is the squared direct distance, this is a nearest mean (e.g., average). In other embodiments, other distances may be used to perform other clustering optimizations. This may be represented by:

$$S_i^{(t)} = \{x_p : \|x_p - m_i^{(t)}\|^2 \leq \|x_p - m_j^{(t)}\|^2 \forall j, 1 \leq j \leq k\}, \quad (1)$$

where x represents the element value coordinates for each piece of content 1210 (e.g., x1=(UNIT A, UNIT B) for a first piece of content 1210); where S is a set 1220, where m are the means for each set, and where each x is assigned to exactly one set S.

After an initial calculation is performed, the clustering groups are adjusted and the new means are calculated to be the centroids of the values x in the new clusters according to:

$$m_i^{(t+1)} = \frac{1}{|S_i^{(t)}|} \sum_{x_j \in S_i^{(t)}} x_j \quad (2)$$

The operation has converged to a final set when the assignments no longer change.

FIG. 12C illustrates an alternative clustering method in accordance with some embodiments. In FIG. 12C, a representative piece of content 1210A is selected, and used as a basis for the generation of a content collection 1230. Piece of content 1210A may be selected by a user requesting a content collection similar to piece of content 1210A, or may be selected by a system that has identified content 1210A as a best (e.g., based on time, image quality, location, etc.) representation of a topic or sub-topic that is selected for a content collection 1230 (e.g., based on trends, numbers of related incoming pieces of content, topic sponsorship, etc.).

In the example illustrated by FIG. 12C, similarity of each piece of content 1210 is calculated with respect to piece of content 1210A, such that the pieces of content 1210 for content collection 1230 are the pieces of content 1210 nearest to piece of content 1210A according to the representation within the space of (UNIT A, UNIT B). In addition, however, a threshold criterion is applied such that only pieces of content 1210 with a value for UNIT B above threshold 1290 are considered for content collection 1230.

Some embodiments operate such that a topic is selected for a content collection when certain criteria, such as a number of pieces of content within a threshold distance of a piece of content having a target threshold value, are met. For example, if a key piece of content having a very high interest score is identified by a system, the system may calculate the number of pieces of content within a distance of the key piece of content. When the number of pieces of content within the threshold distance exceeds a threshold number, a content collection may be generated and automatically made available to system users.

FIG. 13 then illustrates one method for automatic image processing and content curation in accordance with embodiments described herein. Method 1300 may be performed by any device described herein. In some embodiments, method 1300 may be performed by a device in response to processing a set of computer readable instructions stored in a memory of the device and executed by one or more processors of the device. In some other embodiments, similar operations are performed by a local device searching for content collections from a local gallery.

Method 1300 begins with operation 1302 communicating, by a server system, at least a portion of a first content collection to a first client device, wherein the first content collection comprises a first plurality of pieces of content. The server system receives, from the first client device in operation 1304, a first selection communication, the first selection communication identifying a first piece of content of the first plurality of pieces of content.

Operation 1306 then involves analyzing the first piece of content to identify a set of context values for the first piece of content. The analysis of operation 1306 may include any analysis of content for context values such as time and location metadata, quality details, machine vision content details, or any other such analysis described herein. In operation 1308, the server accesses a second content collection comprising pieces of content sharing at least a portion of the set of context values of the first piece of content, wherein the second content collection is selected in response to the first selection communication based on the portion of the set of context values of the first piece of content. In some embodiments, this involves generation of the second content collection in response to the selection communication. In other embodiments, this involves retrieving a previously generated content collection in response to the user selection communication. In operation 1310, the server initiates communication of the second content collection, and communicates at least a portion of the second content collection to the first client device.

Additional embodiments may operate by receiving, at a server computer system, a content message from a first content source of a plurality of content sources, the content message comprising media content. In various embodiments, the content source may be a device such as a smartphone, communicating content messages using elements described in FIG. 4. In other embodiments, any other such content source may be used. As described above, some particular embodiments are part of a social network system, with user entities registered with a system that communicate ephemeral content to a server for use with ephemeral stories. In such embodiments, the server computer system may analyze the content message to determine one or more quality scores and one or more content values associated with the content message. Various different processing methods may be used in different embodiments. In some embodiments, content values are based on matches with other content in a database. In some embodiments, content values are based on machine vision that processes visual content to identify objects. Some such processes, for example, generate text associated with image elements (e.g., "tree" or "dog.") In some such embodiments, the text is used to match a topic or a system content value that is associated with one or more content collections.

The content message is then stored in a database of the server computer system along with the one or more quality scores and the one or more content values. For an ephemeral message, a deletion trigger may remove the content from the server after a trigger threshold is met (e.g., an elapsed time or a threshold number of views). The server computer system then analyzes the content message with a plurality of content collections of the database to identify a match between at least one of the one or more content values and a topic associated with at least a first content collection of the one or more content collections. The server computer system then automatically adds the content message to the first content collection based at least in part on the match.

In various embodiments, each of the operations above may be performed for a plurality of content messages and for messages from multiple content sources. A content collection is thus, in some embodiments, generated from content sourced from a number of different client devices (e.g., content sources). In some embodiments, the analyzed content is reviewed by an operator of a curation tool prior to being added to a content collection. In other embodiments, the content may be reviewed by an operator of a curation tool after the content has been added to the content collection and transmitted to one or more system users. In some embodiments, user feedback from transmissions may be used to adjust scores and re-evaluate which pieces of content are in a content collection, or to flag pieces of content for review by a system operator. Over time, as new pieces of content are received and analyzed by a system, new content may replace previous content as part of analysis and curation of a content collection. Thus, in some embodiments, the operations described above may occur many times for a single content collection, with previous content removed and new content added. In some situations, this is based on new content having higher quality or relevance scores. In some situations, content with lower quality or topic matching scores may be used in place of higher scoring content that is older.

In various embodiments, context information is structured differently, with any number of values for time, location, distance from a target, account information associated with a device that generated the content, audio content, complex "interestingness" scores, or any other such information used as context information. Similarly, any number of quality metrics such as brightness, contrast, saturation, blur, noise quality, audio speech clarity, or other values may be identified and analyzed as part of the image processing and content curation described herein.

In some embodiments, context information such as an "interestingness value" is generated using a neural network generated using a training set of content messages identified as interesting within the server computer system. In some embodiments, this involves the use of convolutional neural network with a feature map including a set of content features and a set of quality features. In other embodiments, data includes feedback messages from users rating selected content messages. Such ratings may be received after the content collection including the content messages has been sent to some users. Such ratings may also be part of any other access system where content is available to users.

Software Architecture

Figure 14:
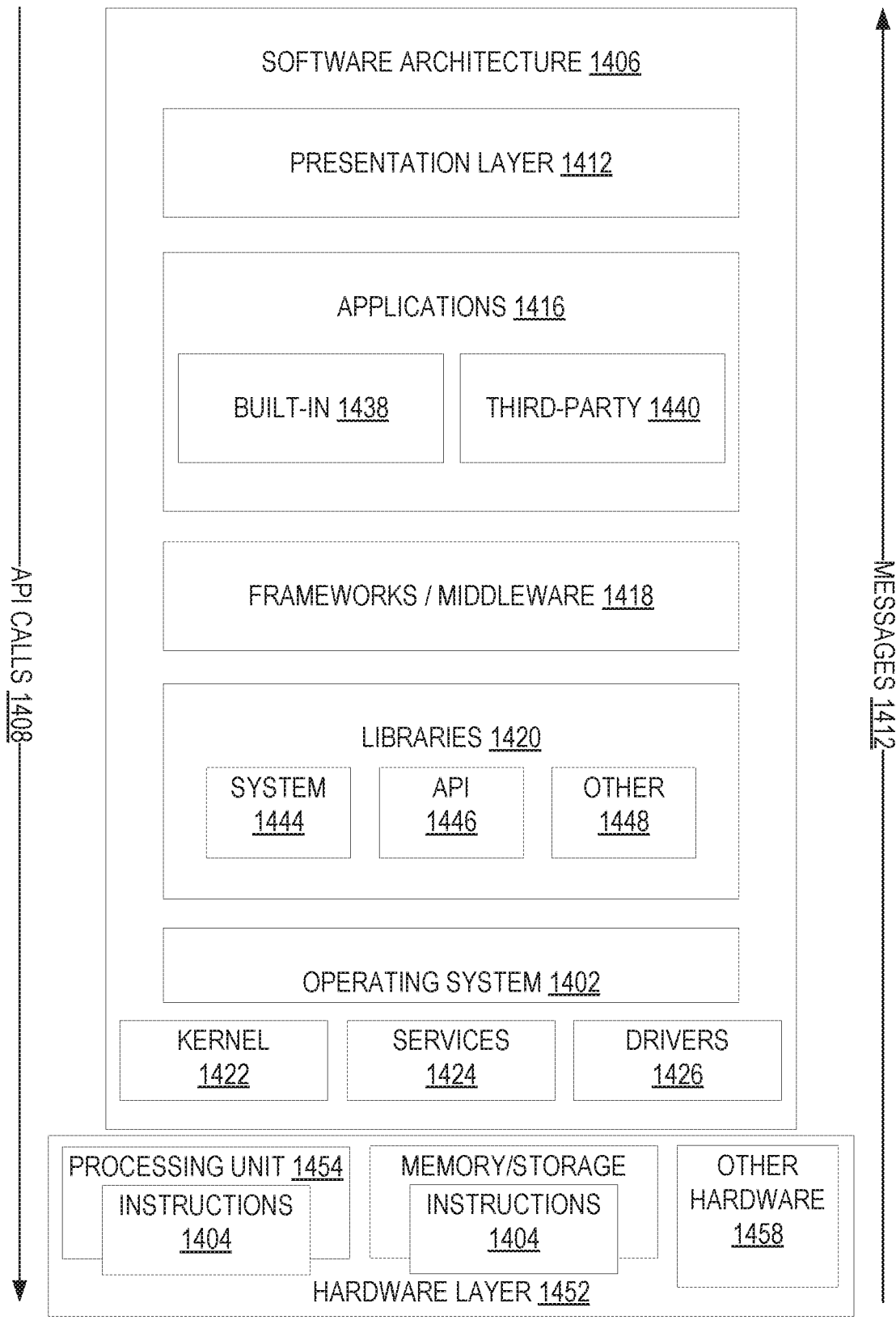
FIG. 14 is a block diagram illustrating a representative software architecture, which may be used in conjunction with various hardware architectures herein described and used to implement various embodiments.

FIG. 14 is a block diagram illustrating an example software architecture 1406, which may be used in conjunction with various hardware architectures herein described. FIG. 14 is a non-limiting example of a software architecture 1406 and it will be appreciated that many other architectures may be implemented to facilitate the functionality described herein. The software architecture 1406 may execute on hardware such as machine 1500 of FIG. 15 that includes, among other things, processors 1504, memory 1514, and I/O components 1518. A representative hardware layer 1452 is illustrated and can represent, for example, the machine 1500 of FIG. 15. The representative hardware layer 1452 includes a processing unit 1454 having associated executable instructions 1404. Executable instructions 1404 represent the executable instructions of the software architecture 1406, including implementation of the methods, components and so forth described herein. The hardware layer 1452 also includes memory and/or storage modules memory/storage, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, applications 1416 and a presentation layer 1414. Operationally, the applications 1416 and/or other components within the layers may invoke application programming interface (API) API calls 1408 through the software stack and receive messages 1412 in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424 and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. Third-party applications 1440 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 1440 may invoke the API calls 1408 provided by the mobile operating system (such as operating system 1402) to facilitate functionality described herein.

The applications 1416 may use built in operating system functions (e.g., kernel 1422, services 1424 and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/ component "logic" can be separated from the aspects of the application/component that interact with a user.

Figure 15:
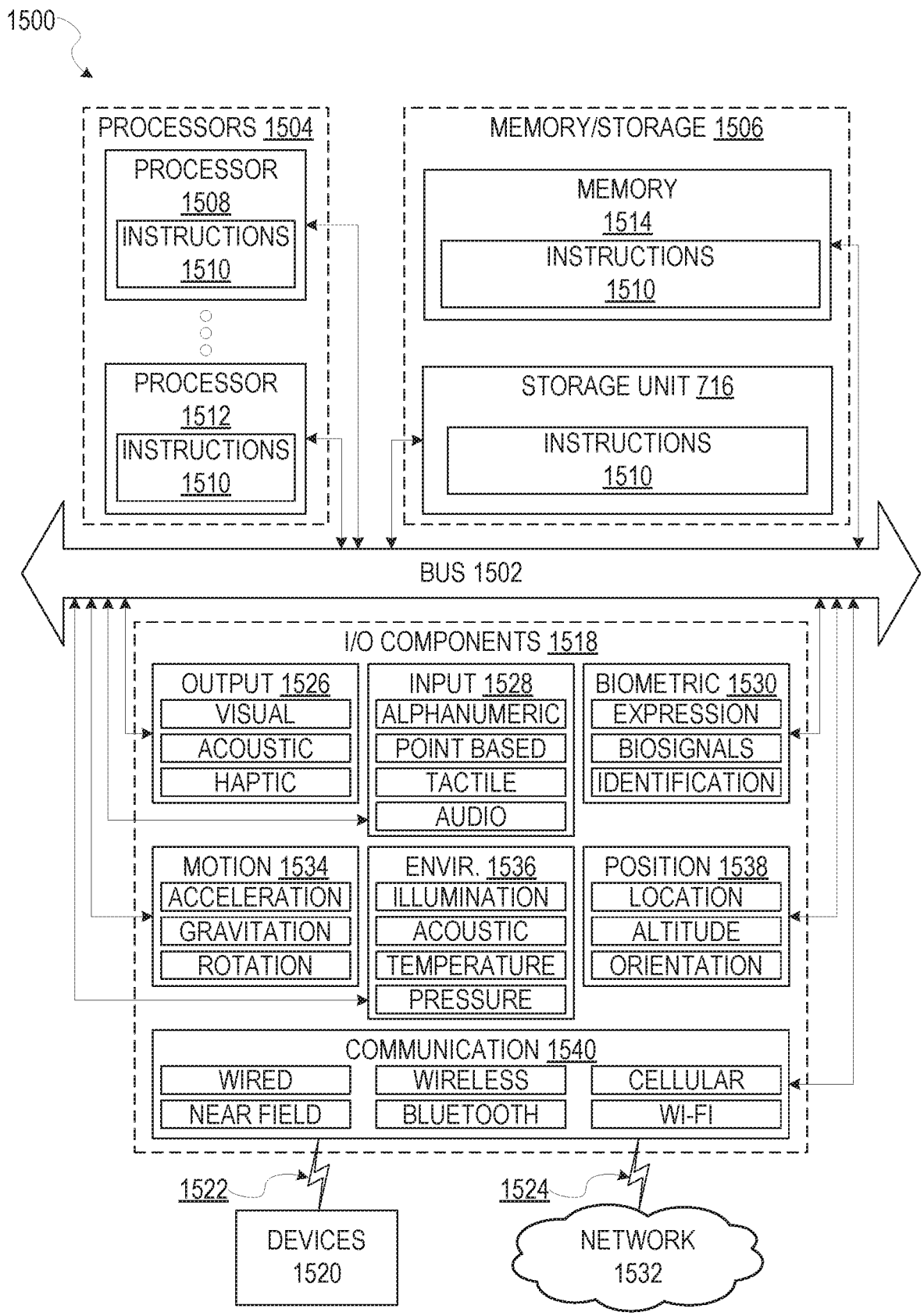
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environment components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1522 and coupling 1524 respectively. For example, the communication components 1540 may include a network interface component or other suitable device to interface with the network 1532. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a Universal Serial Bus (USB)).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory, even if the message is temporarily stored in a non-transitory computer readable medium.

"MACHINE-READABLE MEDIUM" or "NON-TRANSITORY COMPUTER READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   receiving, by a server computer system, a content item from a client device, the content item associated with a geolocation of the client device and a capture time indicating a time when the content item was captured;
   analyzing the content item to identify an object in the content item;
   determining a topic for the content item based on the identified object;
   selecting, based on the topic for the content item and the geolocation of the client device, a geographic area;
   selecting, based on the topic for the content item and the time when the content item was captured, a duration indicating a time period;
   selecting a content collection from a database of content items, wherein the selecting is based on comparing the topic for the content item with topics associated with the content items of the database of content items, the geographic area with geolocations associated with the content items of the database of content items, and the time period with capture times associated with the content items of the database of content items; and
   causing the content collection to be communicated to the client device.

2. The method of claim 1, wherein after the selecting the content collection the method further comprises:

in response to a number of the content items of the content collection being below a threshold number, expanding the geographic area to an expanded geographic area, and re-selecting the content collection from the database of content items, wherein the selecting is based on comparing the topic for the content item with topics associated with the content items of the database of content items, the expanded geographic area with geolocations associated with the content items of the database of content items, and the time period with capture times associated with the content items of the database of content items.

3. The method of claim 1 wherein the geographic area comprises a local geographic area, the local geographic area comprising a geofence of a portion of a city, and wherein expanding the geographic area to the expanded geographic area further comprising:
determining the expanded geographic area to include one or more additional local geographic areas.

4. The method of claim 1 wherein the geographic area comprises a local geographic area, and wherein the method further comprises:
determining a plurality of local geographic areas based on a number of content items generated with each of the local geographic areas of the plurality of local geographic areas.

5. The method of claim 1 wherein the geographic area comprises a local geographic area, the local geographic area comprising a geofence around a venue and the duration being a duration of an event of the venue.

6. The method of claim 5 wherein the venue is one of the following group: a music concert venue, a playground basketball, a park, a school, a university.

7. The method of claim 1 wherein the content collection is an ephemeral content collection with a limited time for a user account associated with the client device to view the content collection.

8. The method of claim 1 further comprising:
analyzing the first content item to determine quality values, the quality values indicating a quality of the content item, and wherein the selecting is further based on comparing the quality with qualities associated with the content items of the database of content items.

9. The method of claim 8 wherein the quality values comprise one or more of the following group: a blur, an exposure, a brightness, and a contrast.

10. The method of claim 8 further comprising:
determining an interestingness value for the content item and interestingness values for the content items of the database of content items, the interestingness value and interestingness values being determined from a neural network trained using a training set of content items identified as interesting by users associated with the database of content items.

11. The method of claim 1 wherein a plurality of objects are identified in the content item, and wherein the determining the topic is based on the plurality of objects.

12. The method of claim 1 wherein the determining the topic is further based on the geolocation of the client device and the capture time.

13. The method of claim 1 wherein the time period is one from the following group: a number of minutes, a number of hours, a number of days, a number of weeks, a number of months, a season, and a number of years.

14. The method of claim 1 wherein the object is one of the following group: a face, a basketball, a basketball court, and a tree.

15. The method of claim 1 further comprising:
receiving, by the server computer system, a selection of a selected content item of the content collection from the client device;
selecting a second content collection from the database of content items, wherein the selecting is based on comparing the topic for the selected content item with topics associated with the content items of the database of content items, a geographic area associated with the selected content item with geolocations associated with the content items of the database of content items, and a capture time of the selected content item with capture times associated with the content items of the database of content items; and
causing the second content collection to be communicated to the client device.

16. The method of claim 1 further comprising:
storing the content item in the database.

17. A server computer system comprising:
a memory; and
one or more processors coupled to the memory, the one or more processors configured to:
receiving, by a server computer system, a content item from a client device, the content item associated with a geolocation of the client device and a capture time indicating a time when the content item was captured;
analyzing the content item to identify an object in the content item;
determining a topic for the content item based on the identified object;
selecting, based on the topic for the content item and the geolocation of the client device, a geographic area;
selecting, based on the topic for the content item and the time when the content item was captured, a duration indicating a time period;
selecting a content collection from a database of content items, wherein the selecting is based on comparing the topic for the content item with topics associated with the content items of the database of content items, the geographic area with geolocations associated with the content items of the database of content items, and the time period with capture times associated with the content items of the database of content items; and
causing the content collection to be communicated to the client device.

18. The server computer system of claim 17, wherein after the selecting the content collection the one or more processors are further configured to:
in response to a number of the content items of the content collection being below a threshold number, expanding the geographic area to an expanded geographic area, and re-selecting the content collection from the database of content items, wherein the selecting is based on comparing the topic for the content item with topics associated with the content items of the database of content items, the expanded geographic area with geolocations associated with the content items of the database of content items, and the time period with capture times associated with the content items of the database of content items.

19. A machine-readable storage device embodying instructions that, when executed by a machine, cause the machine to perform operations comprising:
receiving, by a server computer system, a content item from a client device, the content item associated with a geolocation of the client device and a capture time indicating a time when the content item was captured;

analyzing the content item to identify an object in the content item;

determining a topic for the content item based on the identified object;

selecting, based on the topic for the content item and the geolocation of the client device, a geographic area;

selecting, based on the topic for the content item and the time when the content item was captured, a duration indicating a time period;

selecting a content collection from a database of content items, wherein the selecting is based on comparing the topic for the content item with topics associated with the content items of the database of content items, the geographic area with geolocations associated with the content items of the database of content items, and the time period with capture times associated with the content items of the database of content items; and causing the content collection to be communicated to the client device.

20. The machine-readable storage device of claim 19 wherein after the selecting the content collection the instructions further cause the machine to perform the following operations:

in response to a number of the content items of the content collection being below a threshold number, expanding the geographic area to an expanded geographic area, and re-selecting the content collection from the database of content items, wherein the selecting is based on comparing the topic for the content item with topics associated with the content items of the database of content items, the expanded geographic area with geolocations associated with the content items of the database of content items, and the time period with capture times associated with the content items of the database of content items.

* * * * *